United States Patent
Kawauchi

(10) Patent No.: US 11,230,145 B2
(45) Date of Patent: Jan. 25, 2022

(54) TYRE

(71) Applicant: Sumitomo Rubber Industries, Ltd., Kobe (JP)

(72) Inventor: Yasunori Kawauchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 328 days.

(21) Appl. No.: 16/283,303

(22) Filed: Feb. 22, 2019

(65) Prior Publication Data

US 2019/0270346 A1 Sep. 5, 2019

(30) Foreign Application Priority Data

Mar. 5, 2018 (JP) .............................. JP2018-038857

(51) Int. Cl.
*B60C 11/13* (2006.01)
*B60C 11/03* (2006.01)
*B60C 11/12* (2006.01)

(52) U.S. Cl.
CPC ...... *B60C 11/1307* (2013.01); *B60C 11/0306* (2013.01); *B60C 11/0309* (2013.01);
(Continued)

(58) Field of Classification Search
CPC ............. B60C 11/1307; B60C 11/1315; B60C 11/0309; B60C 11/13; B60C 2011/133;
(Continued)

(56) References Cited

U.S. PATENT DOCUMENTS

| 4,114,671 A | 9/1978 | Maiocchi et al. |
| 4,690,189 A * | 9/1987 | Bradisse ............... B60C 11/033 |
| | | 152/209.15 |

(Continued)

FOREIGN PATENT DOCUMENTS

| CN | 206030966 U * | 3/2017 |
| JP | 1-95910 A | 4/1989 |

(Continued)

OTHER PUBLICATIONS

English translation of JP-2011016490-A by EPO. (Year: 2011).*

(Continued)

*Primary Examiner* — Leith S Shafi
*Assistant Examiner* — Inja Song
(74) *Attorney, Agent, or Firm* — Birch, Stewart, Kolasch & Birch, LLP

(57) ABSTRACT

A tyre comprises a tread portion having a main groove extending continuously in a tyre circumferential direction and a pair of land regions adjacent to the main groove on both sides thereof. At least one of the pair of land regions has, on an edge thereof facing the main groove, a plurality of main groove side step-like portions each having a height decreasing stepwise in two or more steps from a ground contacting surface of the at least one of the pair of the land regions to a bottom surface of the main groove. The main groove side step-like portions include at least a first main groove side step-like portion and a second main groove side step-like portion having different numbers of the steps from each other.

20 Claims, 10 Drawing Sheets

(52) U.S. Cl.
CPC ...... *B60C 11/1204* (2013.01); *B60C 11/1236* (2013.01); *B60C 11/1315* (2013.01); *B60C 11/1384* (2013.01); *B60C 11/1392* (2013.01); *B60C 2011/1213* (2013.01); *B60C 2011/1254* (2013.01)

(58) Field of Classification Search
CPC ..... B60C 2011/1338; B60C 2011/0346; B60C 2011/1213
See application file for complete search history.

(56) References Cited

U.S. PATENT DOCUMENTS

| | | | | |
|---|---|---|---|---|
| 2007/0240801 | A1* | 10/2007 | Tanaka | B60C 11/12 152/209.21 |
| 2009/0272473 | A1* | 11/2009 | Kojima | B60C 11/0302 152/209.15 |
| 2009/0320982 | A1 | 12/2009 | Ochi | |
| 2016/0089939 | A1 | 3/2016 | Oji | |
| 2016/0121659 | A1 | 5/2016 | Kageyama | |
| 2017/0120691 | A1* | 5/2017 | Arai | B60C 11/1307 |
| 2017/0136830 | A1 | 5/2017 | Kuwano | |
| 2018/0312009 | A1* | 11/2018 | Wada | B60C 11/1392 |

FOREIGN PATENT DOCUMENTS

| | | | |
|---|---|---|---|
| JP | 2011016490 A | * | 10/2011 |
| JP | 2016-064781 A | | 4/2016 |

OTHER PUBLICATIONS

English translation of CN-206030966-U by EPO. (Year: 2017).*
Extended European Search Report for European Application No. 19160008.9, dated May 27, 2019.

* cited by examiner

TYRE

TECHNICAL FIELD

The present invention relates to a tyre, and in particular to a tyre suitable for running on a soft road surface.

BACKGROUND ART

Conventionally, various tyres have been proposed to obtain traction on a soft road surface such as a road surface covered with snow or a muddy road surface. For example, Japanese Unexamined Patent Publication No. 2016-64781 has disclosed a tyre having a tread portion provided with land regions having convex portions and concave portions in a tyre circumferential direction and a tyre axial direction.

SUMMARY OF THE INVENTION

However, if the land regions are provided with the convex portions or the like each locally protruding toward a groove adjacent thereto, rigidity of the land regions where the convex portions are formed is decreased, therefore, it is possible that uneven wear resistance performance of the tread portion is decreased.

The present invention was made in view of the above, and a primary object thereof is to provide a tyre capable of exerting the uneven wear resistance performance and running performance on a soft road surface in a good balance.

In one aspect of the present invention, a tyre comprises a tread portion having a main groove extending continuously in a tyre circumferential direction and a pair of land regions adjacent to the main groove on both sides thereof, wherein at least one of the pair of land regions has, on an edge thereof facing the main groove, a plurality of main groove side step-like portions, a height of each of the plurality of the main groove side step-like portions is decreased stepwise in two or more steps from a ground contacting surface of the at least one of the pair of the land regions to a bottom surface of the main groove, and the plurality of the main groove side step-like portions includes at least a first main groove side step-like portion and a second main groove side step-like portion having different numbers of the steps from each other.

In another aspect of the invention, it is preferred that a height of one step of the steps of the first main groove side step-like portion is different from that of the second main groove side step-like portion.

In another aspect of the invention, it is preferred that the plurality of the main groove side step-like portions includes a plurality of the first main groove side step-like portions and a plurality of the second main groove side step-like portions, and the tread portion includes at least a part in which the first main groove side step-like portions and the second main groove side step-like portions are arranged alternately in the tyre circumferential direction.

In another aspect of the invention, it is preferred that the first main groove side step-like portions are arranged on one of the pair of the land regions and the second main groove side step-like portions are arranged on the other one of the pair of the land regions.

In another aspect of the invention, it is preferred that the first main groove side step-like portions and the second main groove side step-like portions are arranged on both of the pair of the land regions in a staggered manner with the main groove in the middle.

In another aspect of the invention, it is preferred that the pair of the land regions includes a part in which the first main groove side step-like portion or one of the first main groove side step-like portions and the second main groove side step-like portion or one of the second main groove side step-like portions are adjacent to each other in a tyre axial direction.

In another aspect of the invention, it is preferred that a protruding width of each of the main groove side step-like portions in a protruding direction from the ground contacting surface of the at least one of the pair of the land regions to the bottom surface of the main groove is in a range of from 25% to 75% of a maximum width of the main groove.

In another aspect of the invention, it is preferred that the at least one of the pair of the land regions has at least one main groove side protruding portion in which a part of the at least one of the pair of the land regions protrudes toward the main groove, and at least one of the plurality of the main groove side step-like portions is arranged at an end portion on a side of the main groove of the main groove side protruding portion.

In another aspect of the invention, it is preferred that the tyre further comprises a plurality of lateral grooves extending in a tyre axial direction and arranged at intervals in the tyre circumferential direction, wherein the at least one of the pair of the land regions is divided into a plurality of blocks by the main groove and the plurality of the lateral grooves, and at least one of edges adjacent to the lateral grooves of the plurality of the blocks includes a lateral groove side step-like portion in which a height thereof is decreased stepwise in two or more steps from a ground contacting surface of the block to which the at least one of the edges belongs to a bottom surface of one of the lateral grooves adjacent thereto.

In another aspect of the invention, it is preferred that an edge of one of the blocks facing the lateral groove side step-like portion with the one of the lateral grooves therebetween has different number of the steps from that of the lateral groove side step-like portion.

In another aspect of the invention, it is preferred that a height of one step of the lateral groove side step-like portion is different from that of the edge adjacent thereto with the one of the lateral grooves therebetween.

In another aspect of the invention, it is preferred that the at least one of the edges adjacent to the lateral grooves of the plurality of the blocks has a lateral groove side protruding portion protruding toward the one of the lateral grooves adjacent thereto, and the lateral groove side step-like portion is arranged at an end portion on a side of the one of the lateral grooves adjacent thereto of the lateral groove side protruding portion.

In another aspect of the invention, it is preferred that the at least one of the pair of the land regions has at least one main groove side protruding portion in which a part of the at least one of the pair of the land regions protrudes toward the main groove, and the main groove side step-like portion is arranged at an end portion on the side of the main groove of at least one of the main groove side protruding portion and the lateral groove side protruding portion.

In another aspect of the invention, it is preferred that a height of one step of the lateral groove side step-like portion is 50% or less of a groove depth of one of the lateral grooves.

In another aspect of the invention, it is preferred that a height of one step of each of the main groove side step-like portions is 50% or less of a groove depth of the main groove.

DESCRIPTION OF THE PREFERRED EMBODIMENT

Figure 1:
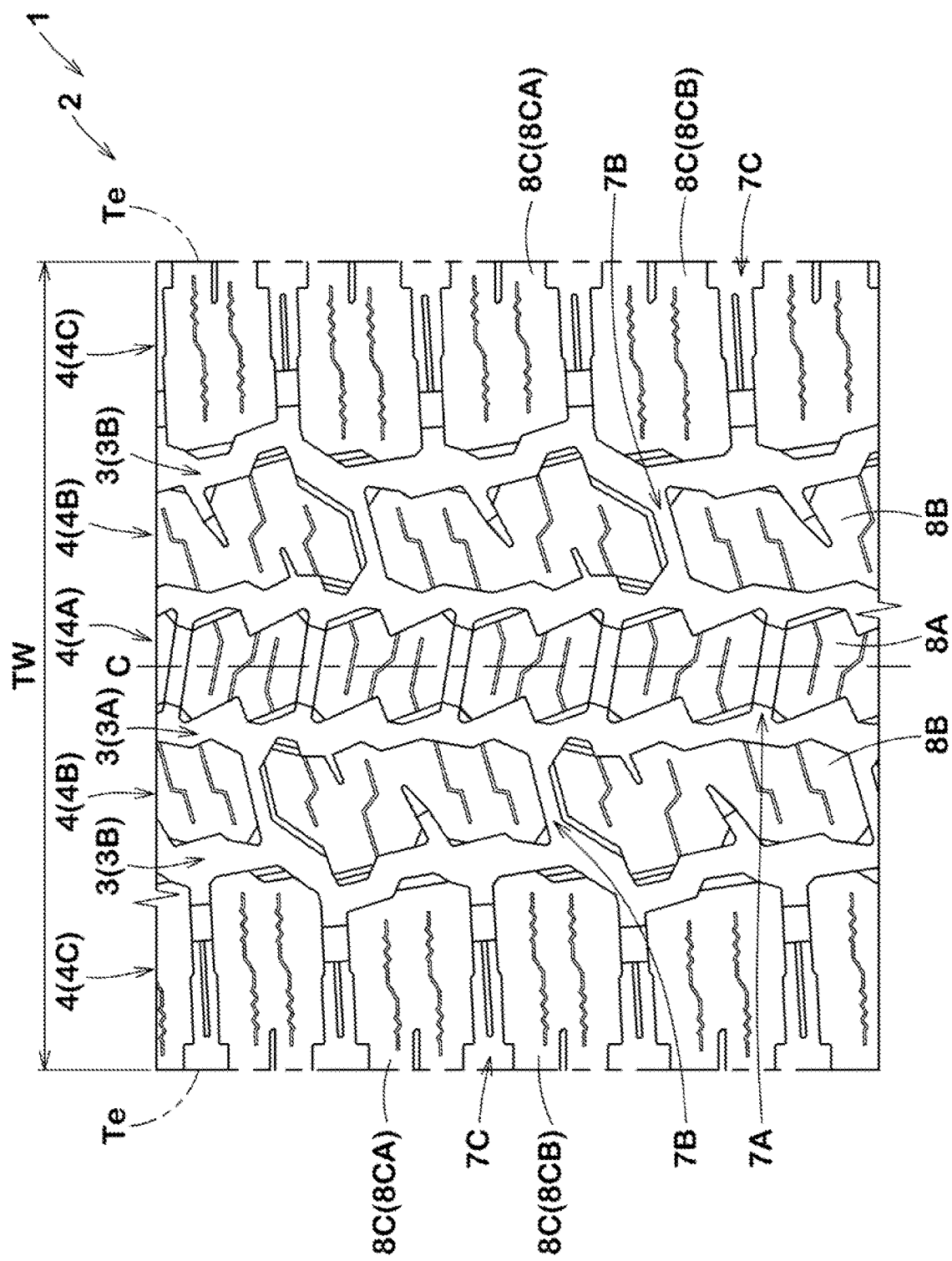
FIG. 1 is a development view of a tread portion of a tyre according to an embodiment of the present invention.

An embodiment of the present invention will now be described in conjunction with accompanying drawings. FIG. 1 is a development view of a tread portion 2 of a tyre 1 showing an embodiment of the present invention. In this embodiment, a pneumatic tyre for a passenger car is shown as a preferred example. However, it goes without saying that the present invention can also be applied to other categories of the tyre 1 such as a tyre for heavy loads and the like, for example.

As shown in FIG. 1, the tread portion 2 in this embodiment has at least main grooves 3 each extending continuously in the tyre circumferential direction and land regions 4 defined on both sides in the tyre axial direction by each of the main grooves 3.

The main grooves 3 in this embodiment include a pair of crown main grooves 3A arranged on both sides of a tyre equator (C), and a pair of shoulder main grooves 3B arranged one by one between one of the crown main grooves 3A and one of tread edges (Te) adjacent thereto, for example. It should be noted that the main grooves 3 are not limited to such an embodiment, and they may be embodied in various forms.

The "tread edges" (Te) are defined as outermost ground contacting positions in the tyre axial direction of a tread ground contacting surface of the tyre 1 in a standard load state. The "standard load state" is a state in which the tyre 1 in a standard state is in contact with a flat surface with zero camber angle by being loaded with a standard tyre load. The "standard state" is a state in which the tyre 1 is mounted on a standard rim, inflated to a standard inner pressure, and loaded with no tyre load. In the standard state, a distance in the tyre axial direction between the tread edges (Te) is defined as a tread width TW. Dimensions and the like of various parts of the tyre 1 are those measured under the standard state, unless noted otherwise.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 in this embodiment has a plurality of the land regions 4 divided by a plurality of the main grooves 3. Specifically, the land regions 4 in this embodiment includes a crown land region 4A defined between the pair of the crown main grooves 3A, a total of a pair of middle land regions 4B each defined between a respective one of the crown main grooves 3A and its adjacent one of the shoulder main grooves 3B, and a total of a pair of shoulder land regions 4C each defined between a respective one of the shoulder main grooves 3B and its adjacent one of the tread edges (Te).

Figure 2:
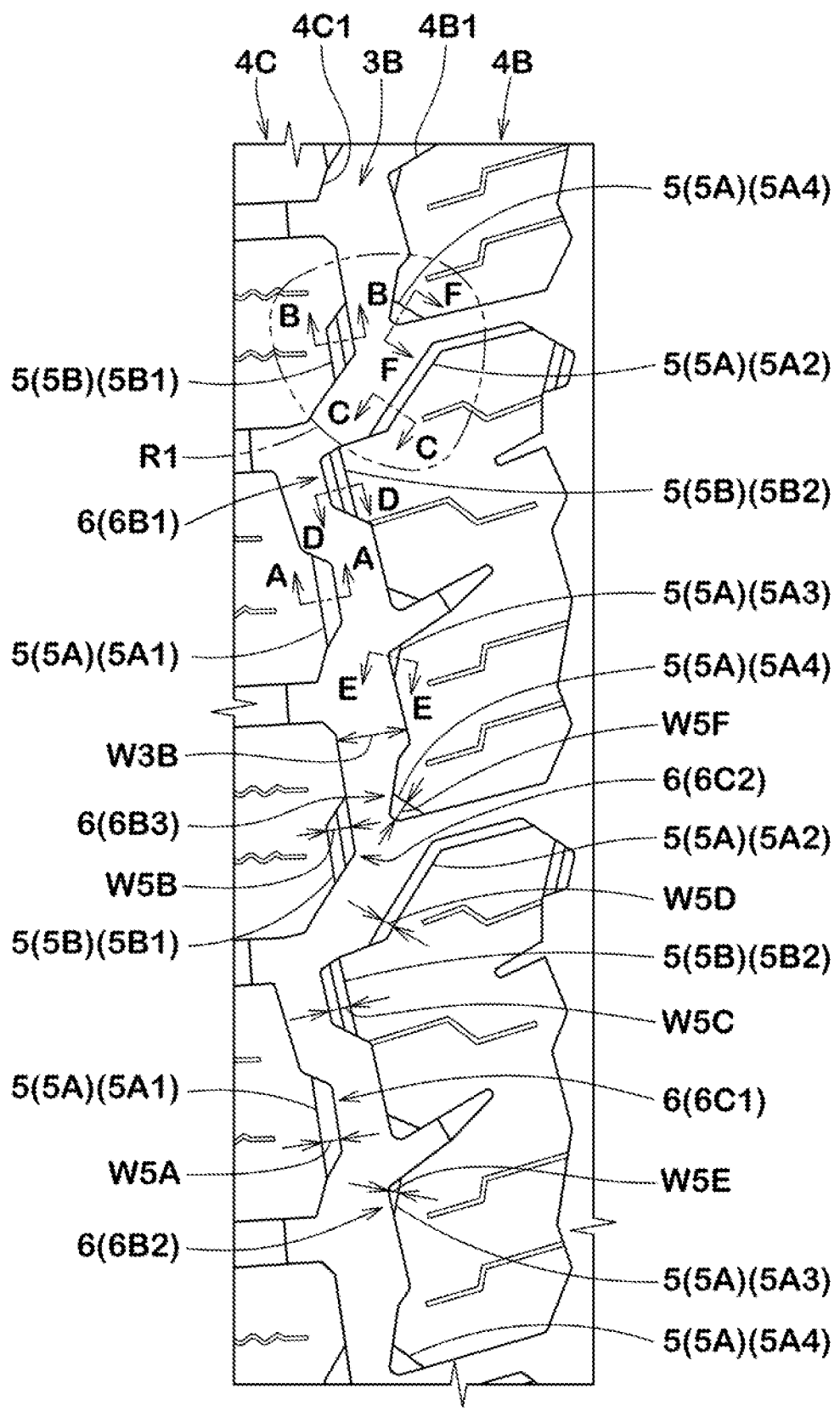
FIG. 2 is an enlarged view showing one of shoulder main grooves of FIG. 1 and land regions adjacent thereto on both sides thereof.

FIG. 2 is an enlarged view showing one of the shoulder main grooves 3B and a part of the middle land region 4B and a part of the shoulder land region 4C adjacent to the shoulder main groove 3B. As shown in FIG. 2, an edge (4C1) facing the shoulder main groove 3B of the shoulder land region 4C has a plurality of main groove side step-like portions 5, for example. The main groove side step-like portions 5 in this embodiment include first main groove side step-like portions 5A and second main groove side step-like portions 5B, for example.

Figure 3A:
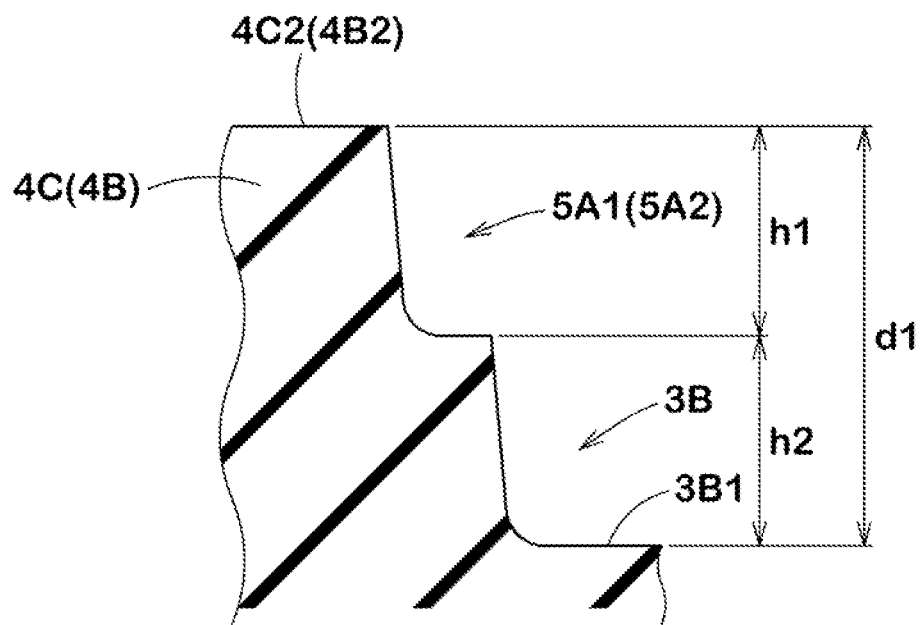
FIG. 3A is a cross-sectional view taken along A-A line and C-C line of FIG. 2.
Figure 3B:
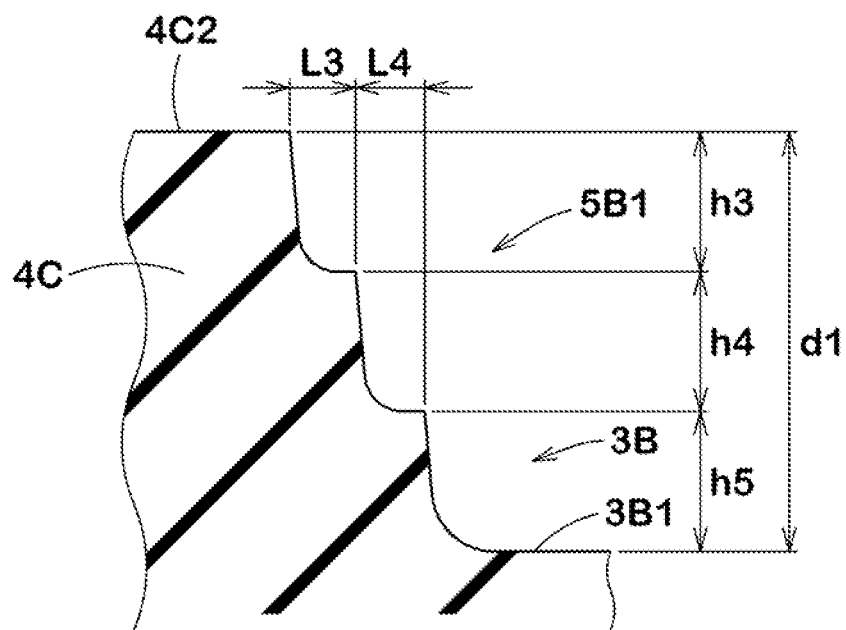
FIG. 3B is a cross-sectional view taken along B-B line of FIG. 2.

FIG. 3A is a cross-sectional view taken along A-A line of FIG. 2. FIG. 3B is a cross-sectional view taken along B-B line of FIG. 2. As shown in FIG. 3A and FIG. 3B, each of the first main groove side step-like portions (5A1) and the second main groove side step-like portions (5B1) is formed so that a height thereof decreases stepwise in two or more steps from a ground contacting surface (4C2) of a respective one of the shoulder land regions 4C to a bottom surface (3B1) of a respective one of the shoulder main grooves 3B, for example. Specifically, as shown in FIG. 3A, the number of the steps of each of the first main groove side step-like portions (5A1) in this embodiment is two and the height thereof decreases in two steps, for example. As shown in FIG. 3B, the number of the steps of each of the second main groove side step-like portions (5B1) in this embodiment is three and the height thereof decreases in three steps, for example. Note that the number of the steps is not limited to two or three, and it may be four or more as long as it is not less than two and the number of the steps of each of the first main groove side step-like portions (5A1) is different from the number of the steps of each of the second main groove side step-like portions (5B1). Further, the main groove side step-like portions 5 may include three or more types having different number of the steps.

As just described, the edge (4C1) is provided with a plurality of the main groove side step-like portions 5, therefore, edge components are increased due to the steps of the main groove side step-like portions 5, thereby, it is possible that the traction on a soft road surface is improved.

Further, the plurality of the main groove side step-like portions 5 includes at least the first main groove side step-like portions 5A and the second main groove side step-like portions 5B each having different number of the steps from that of each of the first main groove side step-like portions 5A. Each of the first main groove side step-like portions 5A has the different number of the steps from that of each of the second main groove side step-like portions 5B, therefore, the rigidity of parts of the shoulder land regions 4C where the first main groove side step-like portions 5A are formed is different from the rigidity of parts of the shoulder land regions 4C where the second main groove side step-like portions 5B are formed. Each of the shoulder land regions 4C has a plurality of parts having different rigidity as just described, therefore, rigidity distribution in the tyre circumferential direction is made uniform in each of the shoulder land regions 4C as a whole, thereby, it is possible that the uneven wear resistance performance is improved.

As shown in FIG. 3A, each of the first main groove side step-like portions (5A1) has a height (h1) of a first step thereof and a height (h2) of a second step thereof, for example. In each of the first main groove side step-like portions (5A1) in this embodiment, the height (h1) and the height (h2) are equal, for example. However, they are not limited to this, and the height h1 and the height h2 may be different from each other.

As shown in FIG. 3B, each of the second main groove side step-like portions (5B1) has a height (h3) of a first step thereof, a height (h4) of a second step thereof, and a height (h5) of a third step thereof, for example. In each of the second main groove side step-like portions (5B1) in this embodiment, the height (h3), the height (h4), and the height (h5) are equal, for example. However, they are not limited to this, and the heights (h3), (h4), and (h5) may be different from each other.

As just described, the numbers of the steps are different between each of the first main groove side step-like portions 5A1 and each of the second main groove side step-like portions 5B1, therefore, the height of one step is different from each other. Specifically, each of the height (h1) and the height (h2) of one step of each of the first main groove side step-like portions (5A1) is larger than each of the height (h3), the height (h4), and the height (h5) of one step of each of the second main groove side step-like portions (5B1), for example.

In each of the first main groove side step-like portions (5A1) and the second main groove side step-like portions (5B1) in this embodiment, it is preferred that each of the heights (h1), (h2), (h3), (h4), and (h5) is 50% or less of a groove depth (d1) of each of the shoulder main grooves 3B, for example. Note that the main groove side step-like portions 5 in this embodiment do not include an embodiment in which the height decreases in one step, for example.

Back to FIG. 2, the first main groove side step-like portions (5A1) and the second main groove side step-like portions (5B1) in this embodiment are arranged alternately in the tyre circumferential direction in the edge (4C1) of each of the shoulder main grooves 3B, for example. As described above, the rigidity of the shoulder land regions 4C is different between the parts where the first main groove side step-like portions (5A1) are formed and the parts where the second main groove side step-like portions (5B1) are formed, therefore, deformation amount when the shoulder land regions 4C receive the load from a road surface is different. That is, unbalanced deformation occurs between the parts of the shoulder land regions 4C where the first main groove side step-like portions (5A1) are formed and the parts thereof where the second main groove side step-like portions (5B1) are formed. Thereby, it is made easy to discharge snow and mud present between each of the parts where the first main groove side step-like portions (5A1) are formed and a respective one of the parts adjacent thereto where the second main groove side step-like portions (5B1) are formed.

In this embodiment, it is preferred that all the first main groove side step-like portions (5A1) and all the second main groove side step-like portions (5B1) are arranged alternately in the tyre circumferential direction along the entire circumference of the tyre, for example. However, they are not limited to this, and it may suffice as long as the tread portion 2 includes at least a part in which the first main groove side step-like portions (5A1) and the second main groove side step-like portions (5B1) are arranged alternately in the tyre circumferential direction in the edge (4C1) of at least one of the shoulder main grooves 3B, for example.

Each of the middle land regions 4B in this embodiment has an edge (4B1) facing one of the shoulder main grooves 3B respectively adjacent thereto, for example. The edge (4B1) has second main groove side step-like portions (5B2), first main groove side step-like portions (5A2), first main groove side step-like portions (5A3), and first main groove side step-like portions (5A4), for example.

Figure 4A:
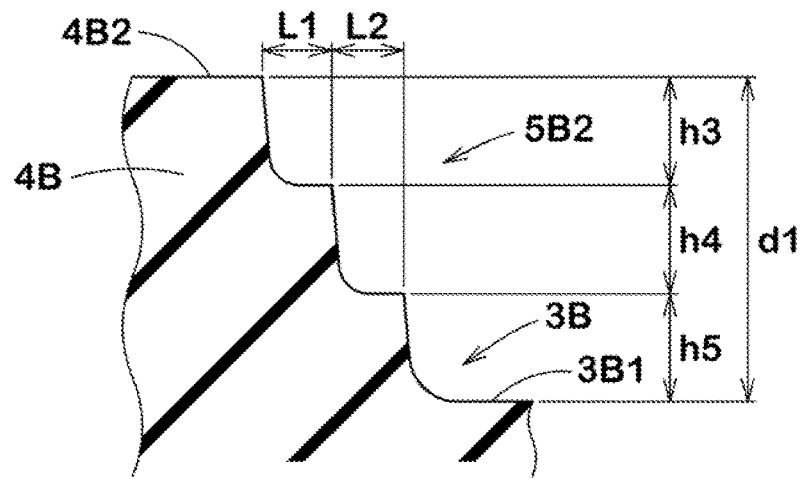
FIG. 4A is a cross-sectional view taken along D-D line of FIG. 2.
Figure 4B:
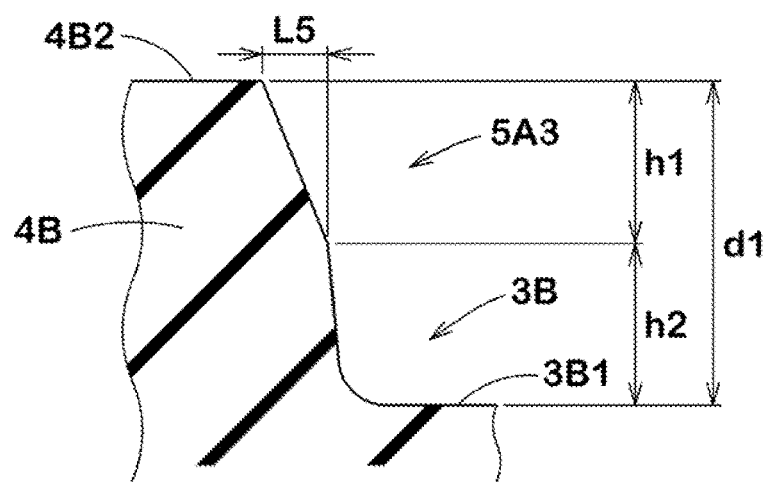
FIG. 4B is a cross-sectional view taken along E-E line of FIG. 2.
Figure 4C:
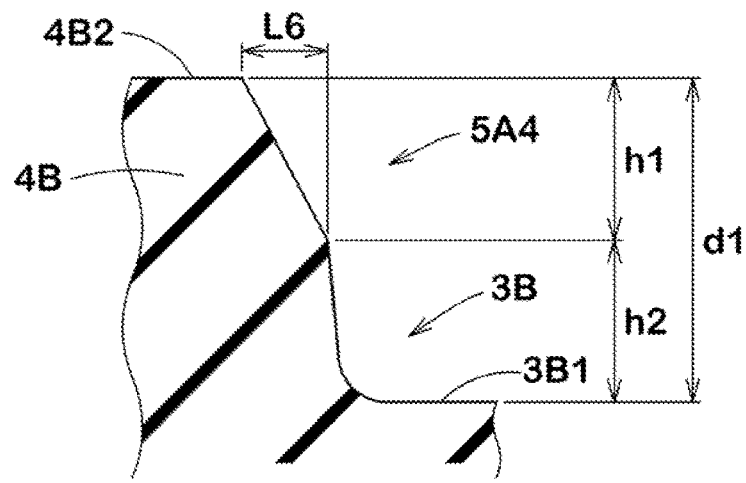
FIG. 4C is a cross-sectional view taken along F-F line of FIG. 2.

A cross-sectional view taken along C-C line of FIG. 2 is similar to the cross-sectional view of FIG. 3A, for example. FIG. 4A is a cross-sectional view taken along D-D line of FIG. 2. FIG. 4B is a cross-sectional view taken along E-E line of FIG. 2. FIG. 4C is a cross-sectional view taken along F-F line of FIG. 2. As shown in FIGS. 3A, 4A, 4B, and 4C, each of the second main groove side step-like portions (5B2), the first main groove side step-like portions (5A2), the first main groove side step-like portions (5A3), and the first main groove side step-like portions (5A4) in this embodiment is formed so that a height thereof decreases stepwise in two or more steps from a ground contacting surface (4B2) of a respective one of the middle land regions 4B to the bottom surface (3B1) of a respective one of the shoulder main grooves 3B, for example.

As shown in FIG. 4A, each of the second main groove side step-like portions (5B2) is formed so that the height thereof decreases stepwise in two steps from the ground contacting surface (4B2) of a respective one of the middle land regions 4B to the bottom surface (3B1) of a respective one of the shoulder main grooves 3B, for example. Each of the second main groove side step-like portions (5B2) in this embodiment has a protruding length (L1) of a first step thereof and a protruding length (L2) of a second step thereof, for example. As shown in FIG. 3B, each of the second main groove side step-like portions (5B1) in this embodiment has a protruding length (L3) of a first step thereof and a protruding length (L4) of a second step thereof, for example. In this embodiment, each of the protruding lengths (L1) and (L2) is larger than each of the protruding lengths (L3) and (L4), for example.

In this embodiment, the protruding length (L1) and the protruding length (L2) are set to be equal, for example. However, they are not limited to this, and the protruding length (L1) and the protruding length (L2) may be different from each other. Further, in this embodiment, the protruding length (L3) and the protruding length (L4) are set to be equal, for example. However, they are not limited to this, and the protruding length (L3) and the protruding length (L4) may be different from each other.

Each of the first main groove side step-like portions (5A2) in this embodiment has a similar cross-sectional shape to that of each of the first main groove side step-like portions (5A1) shown in FIG. 3A, for example. Specifically, that is, each of the first main groove side step-like portions (5A2) is formed so that the height thereof decreases stepwise in two steps from the ground contacting surface (4B2) of a respective one of the middle land regions 4B to the bottom surface (3B1) of a respective one of the shoulder main grooves 3B, for example. Each of the first main groove side step-like portions (5A2) has the height (h1) of a first step thereof and the height (h2) of a second step thereof, for example. In each of the first main groove side step-like portions (5A2) in this embodiment, the height (h1) and the height (h2) are equal, for example. However, they are not limited to this, and they may be different from each other.

As shown in FIG. 4B, each of the first main groove side step-like portions (5A3) is formed so that the height thereof decreases stepwise in two steps from the ground contacting surface (4B2) of a respective one of the middle land regions 4B to the bottom surface (3B1) of a respective one of the shoulder main grooves 3B, for example. In each of the first main groove side step-like portions (5A3) in this embodiment, the first step is smoothly and gradually decreased in height in a slope shape, for example. In this specification, a case in which any one of a plurality of the steps smoothly decreases in height in a slope shape as just described is also included in "stepwise". In each of the first main groove side step-like portions (5A3) in this embodiment, the height (h1) of the first step thereof and the height (h2) of the second step thereof are equal, for example. However, they are not limited to this, and the height (h1) and the height (h2) may be different from each other.

As shown in FIG. 4C, each of the first main groove side step-like portions (5A4) is formed so that the height thereof decreases stepwise in two steps from the ground contacting surface (4B2) of a respective one of the middle land regions 4B to the bottom surface (3B1) of a respective one of the shoulder main grooves 3B, for example. In each of the first main groove side step-like portions (5A4) in this embodiment, the first step is smoothly and gradually decreased in height in a slope shape, for example. In each of the first main groove side step-like portions (5A4) in this embodiment, the height (h1) of the first step thereof and the height (h2) of the second step thereof are equal, for example. However, they are not limited to this, and the height (h1) and the height (h2) may be different from each other.

A protruding length (L5), from the ground contacting surface (4B2) toward a respective one of the shoulder main grooves 3B, of the first step of each of the first main groove side step-like portions (5A3) in this embodiment is smaller than a protruding length (L6), from the ground contacting surface (4B2) toward a respective one of the shoulder main grooves 3B, of the first step of each of the first main groove side step-like portions (5A4) in this embodiment, for example.

In each of the first main groove side step-like portions (5A3) and (5A4) in this embodiment, the first step has a slope shape, but this also increases the edge components, therefore, it is possible that the traction on a soft road surface is improved.

In a region (R1) surrounded by a broken line shown in FIG. 2, one of the first main groove side step-like portions (5A4), one of the second main groove side step-like portions (5B1), and one of the first main groove side step-like portions (5A2) are arranged in this order in the tyre circumferential direction in a staggered manner with the shoulder main groove 3B in the middle, for example. That is, the tread portion in this embodiment includes the region (R1) in which one of the first main groove side step-like portions (5A4) and one of the first main groove side step-like portions (5A2) are arranged in one of the middle land regions 4B and one of the second main groove side step-like portions (5B1) is arranged in one of the shoulder land regions 4C adjacent thereto with one of the shoulder main grooves 3B therebetween, and in the region (R1), the first main groove side step-like portion (5A4), the first main groove side step-like portion (5A2), and the second main groove side step-like portion (5B1) are arranged in a staggered manner with the shoulder main groove 3B in the middle.

Each of the second main groove side step-like portions (5B1) has different number of the steps from that of each of the first main groove side step-like portions (5A2) and (5A4), therefore, the rigidity of the parts of the land regions where the second main groove side step-like portions (5B1) are formed is different from the rigidity of the parts of the land regions where the first main groove side step-like portions (5A2) and (5A4) are formed. The land regions have a plurality of parts having different rigidity as just described, therefore, the rigidity distribution is made uniform in the land regions as a whole, thereby, it is possible that the uneven wear resistance performance is improved.

Further, the first step of each of the first main groove side step-like portions (5A4) is formed in a slope shape, therefore, the rigidity of the part of the middle land regions 4B where the first main groove side step-like portions (5A4) are formed is different from the rigidity of the parts of the middle land regions 4B where the first main groove side step-like portions (5A2) are formed. Thereby, the rigidity distribution is made uniform in the land regions as a whole, therefore, it is possible that the uneven wear resistance performance is improved.

Furthermore, due to the rigidity difference described above, unbalanced deformation occurs between the parts of the middle land regions 4B where the first main groove side step-like portions (5A4) are formed and the parts of the middle land regions 4B where the first main groove side step-like portions (5A2) are formed. Thereby, it is made easy to discharge snow and mud existing between each of the parts where the first main groove side step-like portions (5A2) are formed and a respective one of the parts adjacent thereto where the first main groove side step-like portions (5A4) are formed. As a result, it is possible that excellent traction is maintained over a long period of time during running on a soft road surface.

Figure 5:
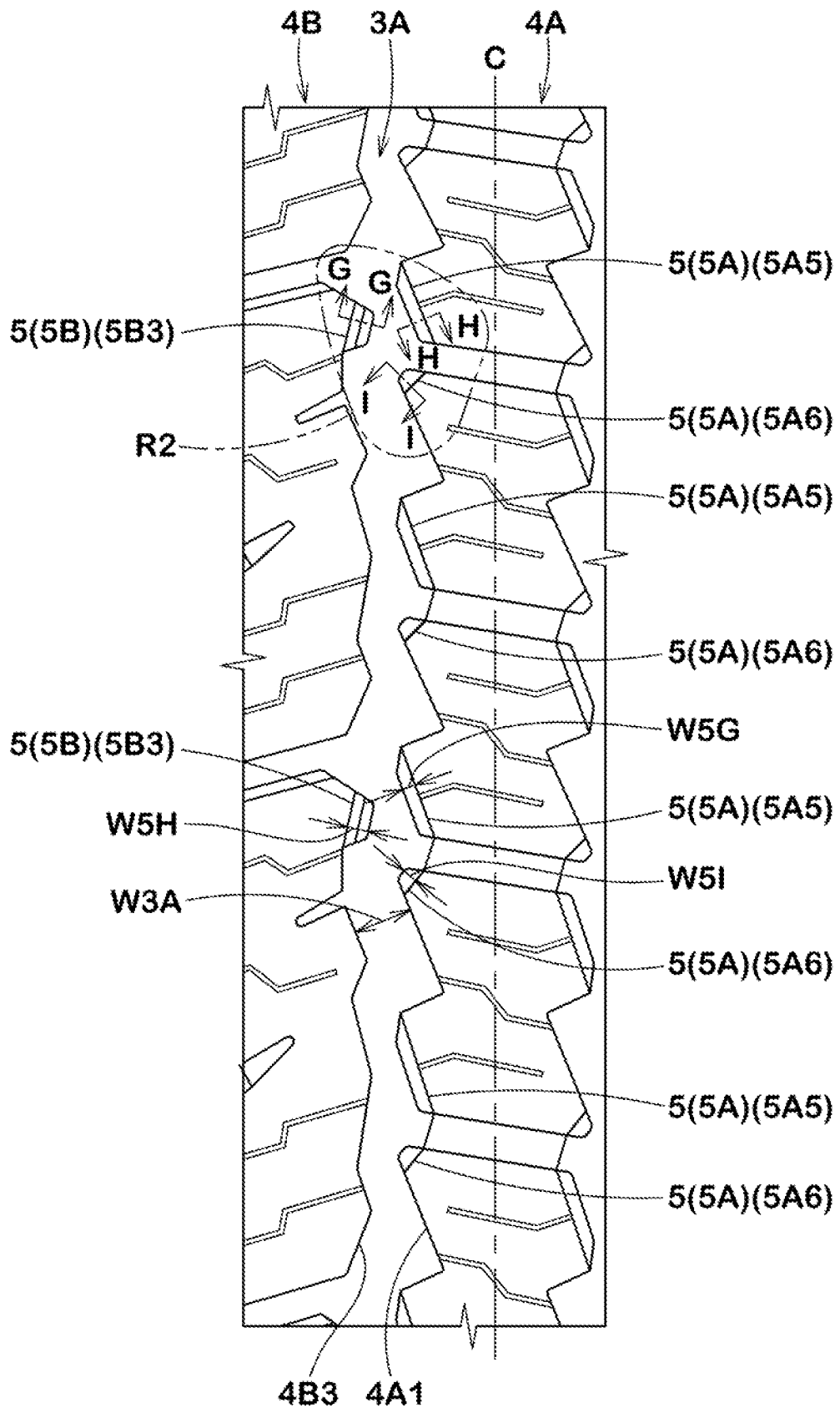
FIG. 5 is an enlarged view of one of crown main grooves of FIG. 1 and the land regions adjacent thereto on both sides thereof.

FIG. 5 is an enlarged view of one of the crown main grooves 3A, and one of the crown land regions 4A and one of the middle land regions 4B adjacent to the crown main grooves 3A. As shown in FIG. 5, an edge (4B3), which faces a respective one of the crown main grooves 3A, of each of the middle land regions 4B in this embodiment has a plurality of main groove side step-like portions 5, for example. The edge (4B3) in this embodiment has a plurality of second main groove side step-like portions (5B3), arranged at intervals in the tyre circumferential direction, for example. A cross-sectional shape of each of the second main groove side step-like portions (5B3) in this embodiment taken along F-F line is similar to the cross-sectional shape of each of the second main groove side step-like portions (5B1) shown in FIG. 3B, for example.

The crown land region 4A in this embodiment has a plurality of first main groove side step-like portions (5A5) and a plurality of first main groove side step-like portions (5A6) on each of edges (4A1) thereof facing a respective one of the crown main grooves 3A, for example. A cross-sectional shape of each of the first main groove side step-like portions (5A5) in this embodiment taken along H-H line is similar to the cross-sectional shape of each of the first main groove side step-like portions (5A1) shown in FIG. 3A, for example. A cross-sectional shape of each of the first main groove side step-like portions (5A6) in this embodiment taken along I-I line is similar to the cross-sectional shape of each of the first main groove side step-like portions (5A4) shown in FIG. 4C, for example.

As shown in FIG. 5, in this embodiment, each of the first main groove side step-like portions (5A5) is adjacent to a respective one of the second main groove side step-like portions (5B3) with a respective one of the crown main grooves 3A therebetween, for example. In this embodiment, each of the first main groove side step-like portions (5A5) has a different number of the steps from that of each of the second main groove side step-like portions (5B3), therefore, they have different rigidity from each other. Thereby, the rigidity distribution in the tyre axial direction is made uniform over the crown land region 4A and the middle land regions 4B, therefore, it is possible that the uneven wear resistance performance is improved.

Further, due to the rigidity difference described above, unbalanced deformation occurs between the parts of the crown land region 4A where the first main groove side step-like portions (5A5) are formed and the parts of the middle land regions 4B where the second main groove side step-like portions (5B3) are formed. Thereby, it is made easy to discharge snow and mud existing in each of the crown main grooves 3A between one of the first main groove side step-like portions (5A5) and its adjacent one of the second main groove side step-like portions (5B3). As a result, it is possible that excellent traction is maintained over a long period of time during running on a soft road surface.

Furthermore, also in a region (R2) surrounded by a broken line shown in FIG. 5, it can be regarded that one of the first main groove side step-like portions (5A5), one of the second main groove side step-like portions (5B3), and one of the first main groove side step-like portions (5A6) are arranged in a staggered manner with one of the crown main grooves 3A in the middle, for example. Thereby, it is possible that the same effect as that of the region (R1) is obtained also in the region (R2).

Note that, as shown in FIG. 2, each of the first main groove side step-like portions (5A4) and a respective one of the second main groove side step-like portions (5B1) can be regarded as being adjacent to each other in the tyre axial direction with a respective one of the shoulder main grooves 3B therebetween, for example. Thereby, the rigidity distribution is made uniform over the middle land region 4B and the shoulder land region 4C adjacent thereto on each side of the tyre equator, therefore, it is possible that the uneven wear resistance performance is improved.

As shown in FIG. 2, at least one of the land regions 4 in this embodiment has at least one main groove side protruding portion 6 in which a part of the at least one of the land regions protrudes to the side of one of the main grooves 3 adjacent thereto. At least one of the main groove side step-like portions 5 in this embodiment is arranged at the tip on a side of the main groove 3 of the main groove side protruding portion 6, for example.

Specifically, each of the shoulder land regions 4C in this embodiment has a plurality of main groove side protruding portions (6C1) and a plurality of main groove side protruding portions (6C2), for example. At an end portion on a side of a respective one of the shoulder main grooves 3B of each of the main groove side protruding portions (6C1) in this embodiment is provided with the first main groove side step-like portion (5A1), for example. At an end portion on a side of a respective one of the shoulder main grooves 3B of each of the main groove side protruding portions (6C2) in this embodiment is provided with the second main groove side step-like portion (5B1), for example.

Further, each of the middle land regions 4B in this embodiment has a plurality of main groove side protruding portions (6B1), a plurality of main groove side protruding portions (6B2), and a plurality of main groove side protruding portions (6B3), for example. At an end portion on a side of a respective one of the shoulder main grooves 3B of each of the main groove side protruding portions (6B1) in this embodiment is provided with the second main groove side step-like portion (5B2), for example. At an end portion on a side of a respective one of the shoulder main grooves 3B of each of the main groove side protruding portions (6B2) in this embodiment is provided with the first main groove side step-like portion (5A3), for example. At an end portion on a side of a respective one of the shoulder main grooves 3B of each of the main groove side protruding portions (6B3) in this embodiment is provided with the first main groove side step-like portion (5A4), for example.

Generally speaking, by providing a land region with a portion protruding toward a side of a main groove, the edge components are increased, therefore, it is possible that the traction is improved. However, the above-described portion protruding toward the side of the main groove increases resistance of water, snow, mud and the like flowing in the main groove, therefore, water drainage performance, snow discharge performance, mud discharge performance and the like are deteriorated. Each of the main groove side protruding portions 6 in this embodiment is provided with the main groove side step-like portion 5 at the end portion on the side of a respective one of the main grooves 3, for example, therefore, compared with a case where no steps are provided, increase of flow resistance of water, snow, mud and the like is suppressed, thereby, it is possible that decrease of the water drainage performance, the snow discharge performance, the mud discharge performance and the like is suppressed.

As shown in FIG. 1, the tread portion in this embodiment has a plurality of middle lateral grooves 7B each extending so as to cross a respective one of the middle land regions 4B in the tyre axial direction. Each of the middle land regions 4B is divided into a plurality of middle blocks 8B by the plurality of the middle lateral grooves 7B.

Figure 6:
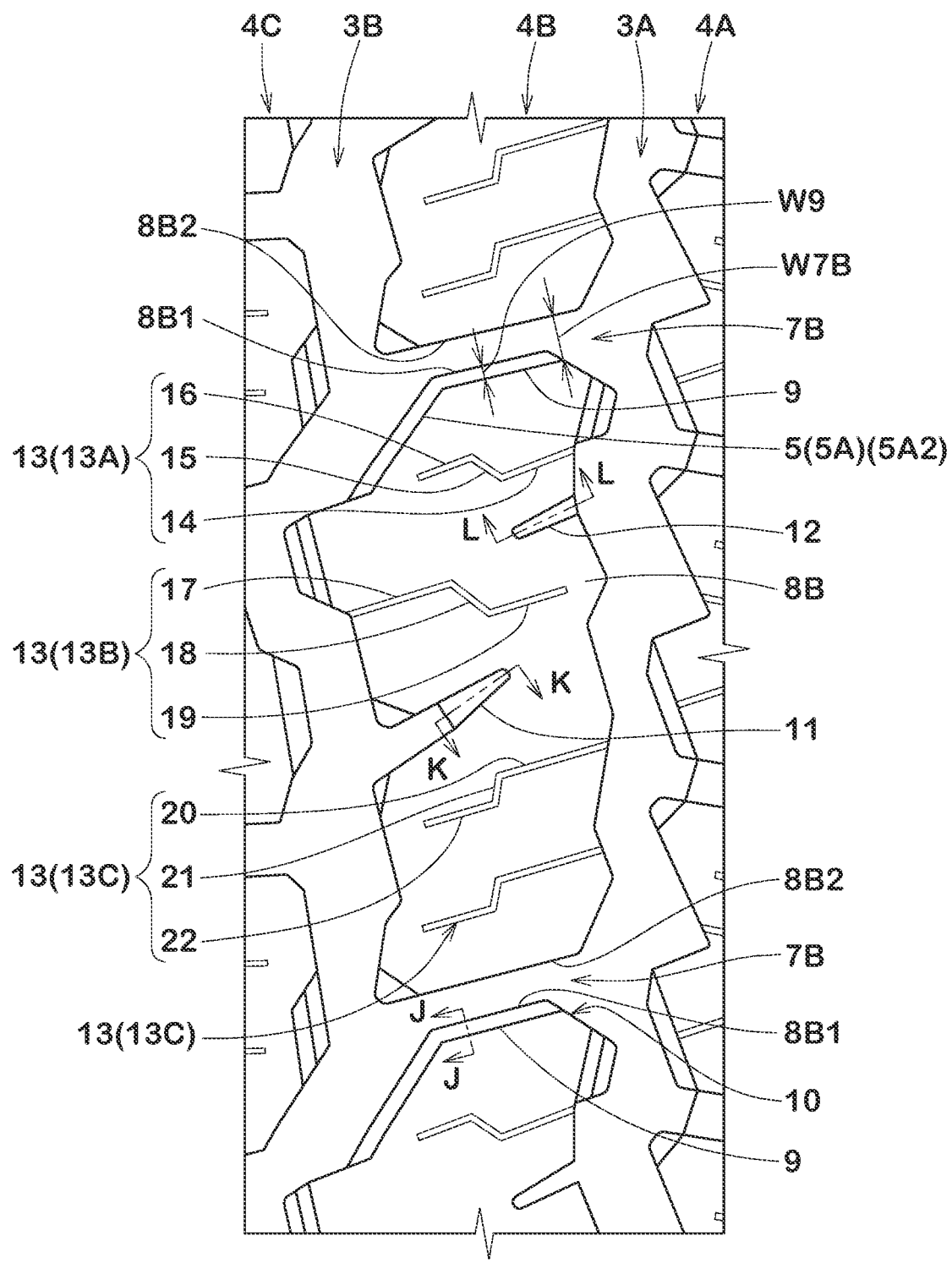
FIG. 6 is an enlarged view of one of middle land regions of FIG. 1.
Figure 7A:
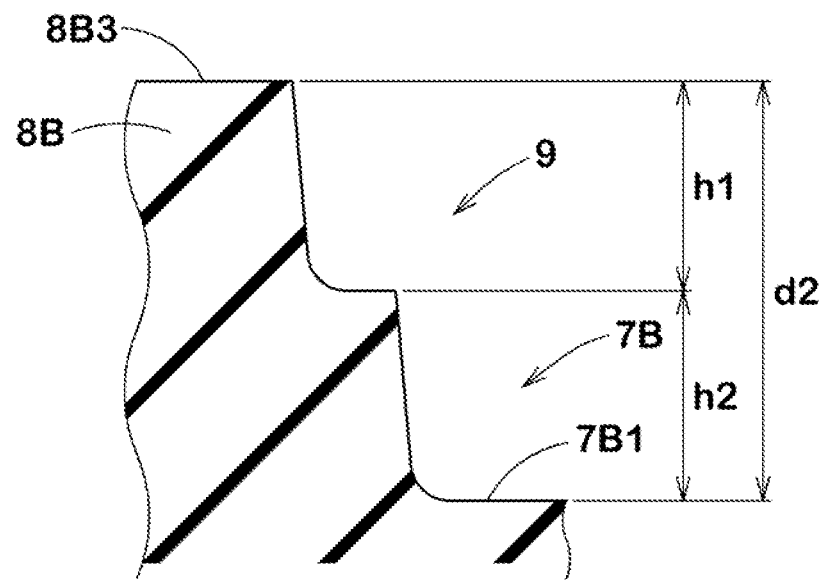
FIG. 7A is a cross-sectional view taken along J-J line of FIG. 6.

FIG. 6 is an enlarged view of one of the middle land regions 4B. FIG. 7A is a cross-sectional view taken along J-J line of FIG. 6. As shown in FIG. 6 and FIG. 7A, each of the plurality of the middle blocks 8B in this embodiment includes a lateral groove side step-like portion 9 formed on at least one of edges (8B1) and (8B2) of a respective one of the middle blocks 8B, for example. Each of the edges (8B1) and (8B2) faces a respective one of the middle lateral grooves 7B and is formed so that a height thereof is decreased stepwise in two or more steps from a ground contacting surface (8B3) of a respective one of the middle blocks to which the at least one of the edges (8B1) and (8B2)

belongs toward a bottom surface (7B1) of one of the middle lateral grooves adjacent thereto. As shown in FIG. 7A, each of the lateral groove side step-like portions 9 in this embodiment is formed so that the height thereof is decreased stepwise in two steps, for example. Each of the lateral groove side step-like portions 9 in this embodiment has the height (h1) of a first step thereof and the height (h2) of a second step thereof, for example. In each of the lateral groove side step-like portions 9 in this embodiment, it is preferred that each of the height (h1) and the height (h2) is 50% or less of a groove depth (d2) of each of the middle lateral grooves 7B, for example.

In each of the middle blocks 8B in this embodiment, the edge (8B1) on one side (upper side in FIG. 2) in the tyre circumferential direction is provided with the lateral groove side step-like portion 9 and the edge (8B2) on the other side (lower side in FIG. 2) in the tyre circumferential direction is not provided with the lateral groove side step-like portion, for example. A height of each of the edges (8B2) is decreased in one step from the ground contacting surface (8B3) of a respective one of the middle blocks 8B to the bottom surface (7B1) of a respective one of the middle lateral grooves 7B, therefore, the number of the steps of each of the edges (8B2) where the lateral groove side step-like portion is not arranged can be considered to be 1. That is, the number of the steps of the edge (8B1) of each of the lateral groove side step-like portions 9 is two, whereas the number of the edge (8B2) is one. Thereby, the lateral groove side step-like portion 9 and the edge (8B2) adjacent to the lateral groove side step-like portion 9 with the middle lateral groove 7B therebetween have different number of the steps from each other.

In this specification, as described above, the number of the steps of the edge where the step-like portion is not provided is regarded as one. Thereby, specifically, each of the lateral groove side step-like portions 9 in this embodiment has the height (h1) of the first step thereof and the height (h2) of the second step thereof, and each of the edges (8B2) in this embodiment has a height of a first step thereof equal to the groove depth (d1) of each of the middle lateral grooves 7B, for example. It is preferred that each of the heights (h1) and (h2) is 50% or less of the groove depth (d1), for example.

Note that in each of the lateral groove side step-like portions 9 in this embodiment, the heights (h1) and (h2) are equal, for example, however, they are not limited to this and the heights (h1) and (h2) may be different from each other.

As just described, in this embodiment, the lateral groove side step-like portion 9 and the edge (8B2) facing each other with the middle lateral groove therebetween have different number of the steps, therefore, they have different rigidity. Thereby, in each of the middle blocks 8B, a portion on a side of the edge (8B1) and a portion on a side of the edge (8B2) have different deformation amount, therefore, unbalanced deformation occurs, thus, it is made easy for snow and mud in the middle lateral grooves 7B to be discharged. As a result, it is possible that excellent traction during running on a soft road surface is maintained over a long period of time.

Further, at least one of the edges (8B1) and (8B2) of each of the middle blocks 8B in this embodiment has a lateral groove side protruding portion 10 protruding toward one of the middle lateral grooves 7B adjacent thereto, for example. The lateral groove side step-like portion 9 is arranged at an end portion on a side of a respective one of the middle lateral grooves 7B of each of the lateral groove side protruding portions in this embodiment, for example.

Like the main groove side protruding portions 6 described above, in the lateral groove side protruding portions in this embodiment, increase of the flow resistance of water, snow, mud, and the like flowing through the middle lateral grooves 7B is suppressed as compared with a case where no steps are provided in the lateral groove side protruding portions, therefore, it is possible that the deterioration of the water drainage performance, the snow discharge performance, the mud discharge performance, and the like is suppressed.

Note that in this embodiment, each of the edges (8B1) is provided with the lateral groove side step-like portion 9 and none of the edges (8B2) is provided with the lateral groove side step-like portion. Further, in this embodiment, the number of the steps of the lateral groove side step-like portion 9 of each of the edges (8B1) is two whereas the number of the steps of each of the edges (8B2) where the lateral groove side step-like portion is not provided is one, but the present invention is not limited to this. Both of the edges (8B1) and (8B2) may be provided with the lateral groove side step-like portions having different number of the steps from each other, for example.

Furthermore, at least one of the edges (8B2) may be provided with the lateral groove side protruding portion. In this case, in order to suppress the above-described increase of the flow resistance of water, snow, mud, and the like, it is preferred that the lateral groove side step-like portion is arranged in the lateral groove side protruding portion. In the above case, it is preferred that the numbers of the steps of the edges (8B1) and (8B2) facing each other with the middle lateral groove 7B therebetween are different from each other.

Furthermore, as shown in FIG. 6, the first main groove side step-like portions (5A2) in this embodiment may be arranged on an end portion on a side of the shoulder main grooves 3B of the lateral groove side protruding portion 10, for example. As just described, the arrangement of the step-like portions is not limited to the protruding end portions of the protruding portions, therefore, it is possible that the degree of freedom in arrangement of the step-like portions is increased. More specifically, it is possible that the alternate arrangement or the staggered arrangement in the tyre circumferential direction of the first main groove side step-like portions and the second main groove side step-like portions is realized more easily.

Back to FIG. 2, the first main groove side step-like portions (5A1), (5A2), (5A3), and (5A4) in this embodiment respectively have protruding widths W5A, W5D, W5E, and W5F, in a respective protruding direction, for example. The second main groove side step-like portions (5B1) and (5B2) in this embodiment respectively have protruding widths W5B and W5C in a respective protruding direction, for example.

Here, the protruding direction mentioned above is a direction in which the step of the main groove side step-like portion decreases as it goes toward the bottom surface of the main groove from an edge on a side of the main groove of the ground contacting surface of the land region to which the concerned main groove side step-like portion belongs. The protruding direction in this embodiment may be a direction perpendicular to the edge of the step of the main groove side step-like portion, for example. The protruding width of each of the main groove side step-like portions is a maximum width in the respective protruding direction to the side of a respective one of the shoulder main grooves 3B. Hereinafter, the same applies to the protrusion widths of the other step-like portions.

Each of the shoulder main grooves 3B has a main groove maximum width W3B. The main groove maximum width is the largest distance among distances between groove walls on both sides of the main groove in a direction orthogonal to a longitudinal direction thereof in a portion thereof where the groove walls on both sides are parallel to each other. Hereinafter, the same applies to the maximum widths of the other main grooves and lateral grooves.

It is preferred that each of the protruding widths W5A, W5D, W5E, W5F, W5B, and W5C is in a range of from 25% to 75% of the main groove maximum width W3B, for example. If each of the protruding widths is more than 75% of the main groove maximum width W3B, rigidity difference between the first step-like portions and the second step-like portions becomes excessively large, therefore, it is possible that the influence of uneven wear becomes larger than the effect of uniformization of the rigidity distribution. Further, if each of the protruding widths is more than 75% of the main groove maximum width W3B, the flow resistance of water, snow, mud, and the like flowing through the shoulder main grooves 3B becomes large, therefore, it is possible that the water drainage performance, the snow discharge performance, the mud discharge performance, and the like are deteriorated. If each of the protruding widths is less than 25% of the main groove maximum width W3B, the edge components cannot be sufficiently increased, therefore, it is possible that the effect of improving the traction cannot be obtained sufficiently.

Back to FIG. 5, the first main groove side step-like portions (5A5) and (5A6) in this embodiment respectively have protruding widths W5G and W5I in the respective protruding direction, for example. Each of the second main groove side step-like portions (5B3) in this embodiment has a protruding width W5H, for example. Each of the crown main grooves 3A has a main groove maximum width W3A.

For the same reason as described above, it is preferred that each of the protruding widths W5G, W5H, and W5I in this embodiment is in a range of from 25% to 75% of the main groove maximum width W3A, for example.

Back to FIG. 6, each of the lateral groove side step-like portion 9 in this embodiment has a protruding width W9, for example. The protruding width W9 of each of the lateral groove side step-like portions 9 is a maximum width in a protruding direction thereof toward a side of a respective one of the middle lateral grooves 7B. Each of the middle lateral grooves 7B in this embodiment has a lateral groove maximum width W7B. The lateral groove maximum width W7B is the largest distance among distances between groove walls on both sides of the middle lateral groove 7B in a direction orthogonal to a longitudinal direction thereof in a portion thereof where the groove walls on both sides are parallel to each other. The lateral groove maximum width W7B in this embodiment is equal to a distance between edges, which face each other with one of the middle lateral grooves therebetween, of the ground contacting surfaces of a pair of the middle blocks 8B adjacent to each other in the tyre circumferential direction, for example.

It is preferred that the protruding width W9 of each of the lateral groove side step-like portions 9 in this embodiment is in a range of from 25% to 75% of the lateral groove maximum width W7B, for example. If the protruding width W9 is more than 75% of the lateral groove maximum width W7B, rigidity difference between the edge (8B1) and the edge (8B2) adjacent to each other of the middle blocks 8B becomes excessively large, therefore, it is possible that the influence of the uneven wear becomes larger than the effect of uniformization of the rigidity distribution. Further, if the protruding width W9 is larger than 75% of the lateral groove maximum width W7B, the flow resistance of water, snow, mud, and the like flowing through the middle lateral grooves 7B becomes large, therefore, it is possible that the water drainage performance, the snow discharge performance, the mud discharge performance, and the like are deteriorated. If the protruding width W9 is less than 25% of the lateral groove maximum width W7B, the edge components cannot be sufficiently increased, therefore, it is possible that the effect of improving the traction cannot be obtained sufficiently.

Each of the middle blocks 8B has a first middle lateral groove 11 and a second middle lateral groove 12. The first middle lateral groove 11 extends axially inwardly from one of the shoulder main grooves 3B and terminates within the middle block 8B. The second middle lateral groove 12 extends axially outwardly from one of the crown main grooves 3A and terminates within the middle block 8B.

The first middle lateral grooves 11 and the second middle lateral grooves 12 in this embodiment are inclined with respect to the tyre axial direction, for example. It is preferred that the first middle lateral grooves 11 and the second middle lateral grooves 12 in this embodiment are inclined in the same direction with respect to the tyre axial direction, for example.

Figure 7B:
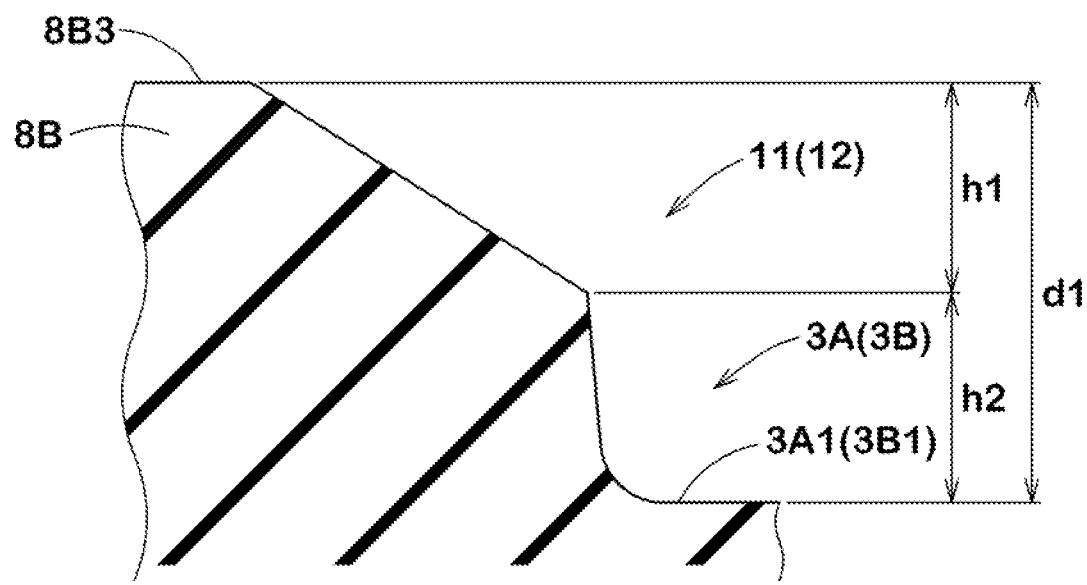
FIG. 7B is a cross-sectional view taken along K-K line and L-L line of FIG. 6.

FIG. 7B is a cross-sectional view of one of the first middle lateral grooves 11 taken along K-K line of FIG. 6 and a cross-sectional view of one of the second middle lateral grooves 12 taken along L-L line of FIG. 6. As shown in FIG. 7B, each of the first middle lateral grooves 11 in this embodiment is formed so that a height thereof is decreased stepwise in two steps from the ground contacting surface (8B3) of a respective one of the middle blocks 8B to the bottom surface (3B1) of a respective one of the shoulder main grooves 3B, for example. Each of the second middle lateral grooves 12 in this embodiment is formed so that a height thereof is decreased stepwise in two steps from the ground contacting surface (8B3) of a respective one of the middle blocks 8B to a bottom surface (3A1) of a respective one of the crown main grooves 3A, for example. The first step of each of the first middle lateral grooves 11 and the second middle lateral grooves 12 is formed in a slope shape in which a height thereof is decreased gradually and smoothly, for example.

The slope-shaped first step of each of the first middle lateral grooves 11 extends from the ground contacting surface of a respective one of the middle blocks 8B to a middle position in a longitudinal direction of the first middle lateral groove 11. The slope-shaped first step of each of the second middle lateral grooves 12 extends from the ground contacting surface of a respective one of the middle blocks 8B to a terminating position in a longitudinal direction of the second middle lateral groove 12. That is, the first step of each of the second middle lateral grooves 12 extends to a connection position with a respective one of the crown main grooves 3A.

The slope-shaped first step of each of the first middle lateral grooves 11 in this embodiment is formed in a tapered shape in which a groove width thereof gradually and smoothly decreases from a connection portion of the first step and the second step thereof toward the ground contacting surface of a respective one of the middle blocks 8B, for example. The slope-shaped first step of each of the second middle lateral grooves 12 in this embodiment, that is, the entire second middle lateral groove 12 is formed in a tapered shape in which a groove width thereof gradually and smoothly decreases from a respective one of the crown main grooves 3A to the ground contacting surface of a respective one of the middle blocks 8B, for example.

Each of the first middle lateral grooves 11 and the second middle lateral grooves 12 in this embodiment is formed in a tapered shape as just described, therefore, snow and mud entered from the middle lateral grooves from the side of the main groove are firmly compressed, thereby, it is possible that larger shearing force is obtained. Further, since the first step of each of the first middle lateral grooves 11 and the second middle lateral grooves 12 in this embodiment is formed in a slope shape, it is made easy for snow and mud that have entered the respective middle lateral groove to be discharged, therefore, it is possible that clogging of snow and mud is suppressed. Thereby, it is possible that excellent traction is maintained over a long period of time during running on a soft road surface.

Further, as shown in FIG. 6, each of the middle blocks 8B in this embodiment has at least one middle sipe 13 extending in the tyre axial direction, for example. The middle sipe 13 in this embodiment is a semi-open sipe in which one end thereof is connected with one of the main grooves 3 and the other end thereof terminates within the middle block 8B, for example. Each of the middle blocks 8B in this embodiment has a plurality of the middle sipes 13, for example. The plurality of the middle sipes 13 in this embodiment include a first middle sipe 13A, a second middle sipe 13B, and third middle sipes 13C, for example.

The first middle sipe 13A in this embodiment consists of a first middle sipe portion 14, a second middle sipe portion 15, and a third middle sipe portion 16, for example. The first middle sipe portion 14 extends axially outwardly from a respective one of the crown main grooves 3A and is inclined to one side in the tyre circumferential direction with respect to the tyre axial direction, for example. The second middle sipe portion 15 is connected with an end portion of the first middle sipe portion 14 on a side opposite to a respective one of the crown main grooves 3A, extends axially outwardly, and is inclined to the other side in the tyre circumferential direction with respect to the tyre axial direction, for example. The third middle sipe portion 16 is connected with an end portion of the second middle sipe portion 15 on a side opposite to the first middle sipe portion 14, is inclined to the one side in the tyre circumferential direction with respect to the tyre axial direction, extends axially outwardly, and terminates within a respective one of the middle blocks 8B, for example.

The second middle sipe 13B in this embodiment consists of a first middle sipe portion 17, a second middle sipe portion 18, and a third middle sipe portion 19, for example. The first middle sipe portion 17 extends axially inwardly from a respective one of the shoulder main grooves 3B and is inclined to the other side in the tyre circumferential direction with respect to the tyre axial direction, for example. The second middle sipe portion 18 is connected with an end portion of the first middle sipe portion 17 on a side opposite to a respective one of the shoulder main grooves 3B, extends axially inwardly, and is inclined to the one side in the tyre circumferential direction with respect to the tyre axial direction, for example. The third middle sipe portion 19 is connected with an end portion of the second middle sipe portion 18 on a side opposite to the first middle sipe portion 17, is inclined to the other side in the tyre circumferential direction with respect to the tyre axial direction, extends axially inwardly, and terminates within a respective one of the middle blocks 8B, for example.

The third middle sipes 13C in this embodiment consists of a first middle sipe portion 20, a second middle sipe portion 21, and a third middle sipe portion 22, for example. The first middle sipe portion 20 extends axially outwardly from a respective one of the crown main grooves 3A and is inclined to the one side in the tyre circumferential direction with respect to the tyre axial direction, for example. The second middle sipe portion 21 is connected with an end portion of the first middle sipe portion 20 on a side opposite to a respective one of the crown main grooves 3A, extends axially outwardly, and is inclined to the other side in the tyre circumferential direction with respect to the tyre axial direction, for example. The third middle sipe portion 22 is connected with an end portion of the second middle sipe portion 21 on a side opposite to the first middle sipe portion 20, is inclined to the one side in the tyre circumferential direction with respect to the tyre axial direction, extends axially outwardly, and terminates within a respective one of the middle blocks 8B, for example. Each of the middle blocks 8B in this embodiment has a pair of the third middle sipes 13C.

In each of the middle blocks 8B in this embodiment, the first middle sipe 13A and the second middle sipe 13B are arranged on the other side (the upper side in FIG. 6) in the tyre circumferential direction of the first middle lateral groove 11 and the pair of the third middle sipes 13C is arranged on the one side (the lower side in FIG. 6) in the tyre circumferential direction of the first middle lateral groove 11. The second middle lateral groove 12 is arranged at a middle position in the tyre circumferential direction between the first middle sipe 13A and the second middle sipe 13B.

By the middle sipes 13 configured as such in this embodiment, the edge components are increased, therefore, it is possible that the traction is improved, for example. Note that the numbers and the arrangement of the middle lateral grooves and the middle sipes described above in each of the middle blocks 8B are merely examples and are not limited to the above-described embodiments.

It should be noted that, in this specification, each of the sipe and the sipe portion means a cut having a smaller width than that of a groove. Specifically, in this specification, each of the sipe and the sipe portion is defined as a cut having a width of 1.5 mm or less, and the groove is defined as a cut having a width larger than 1.5 mm, for example.

As shown in FIG. 1, the tread portion 2 in this embodiment has a plurality of crown lateral grooves 7A each extending in the tyre axial direction so as to cross the crown land region 4A. The crown land region 4A is divided into a plurality of crown blocks 8A by the plurality of the crown lateral grooves 7A.

Figure 8:
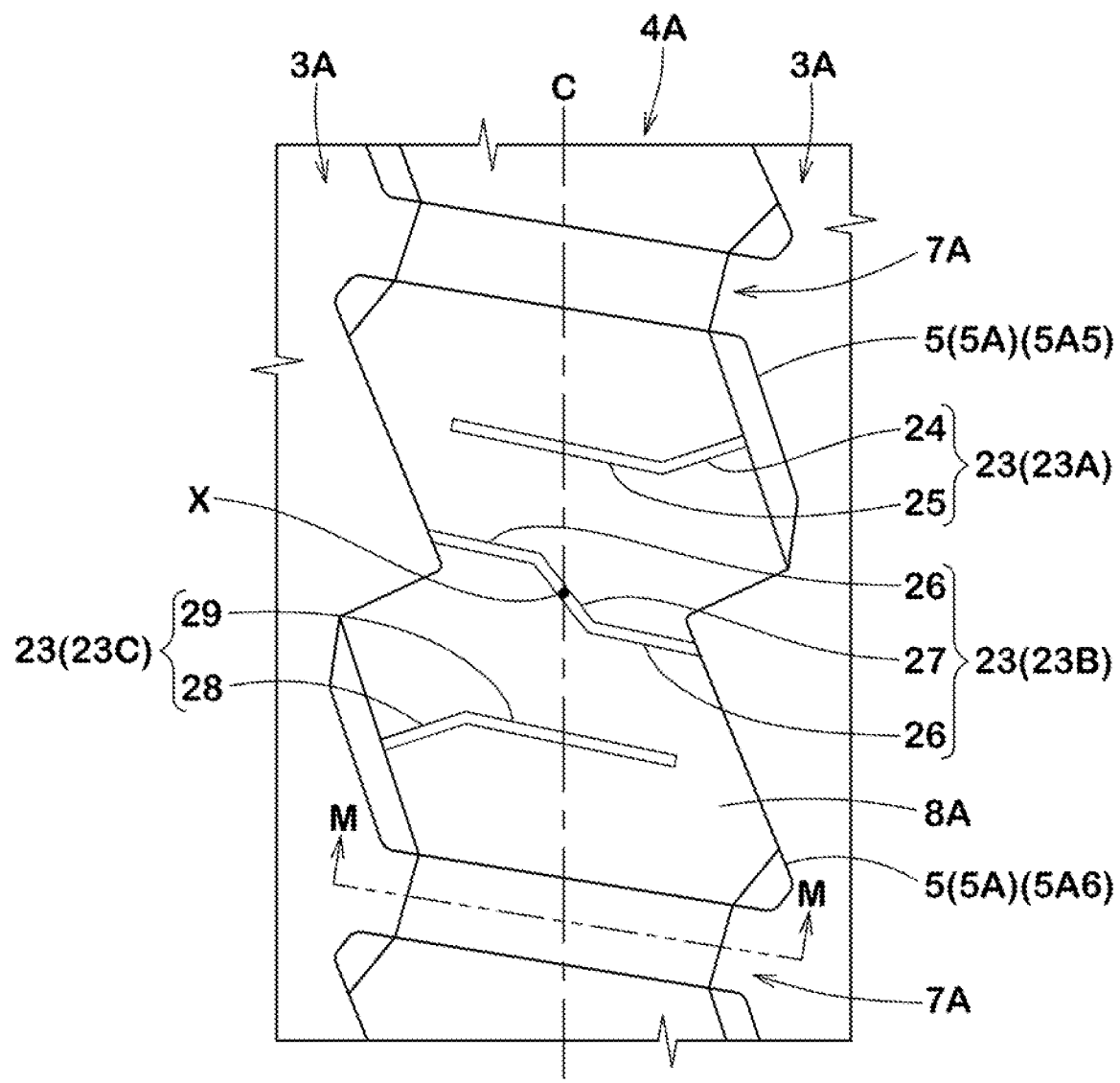
FIG. 8 is an enlarged view of a crown land region of FIG. 1.
Figure 9A:
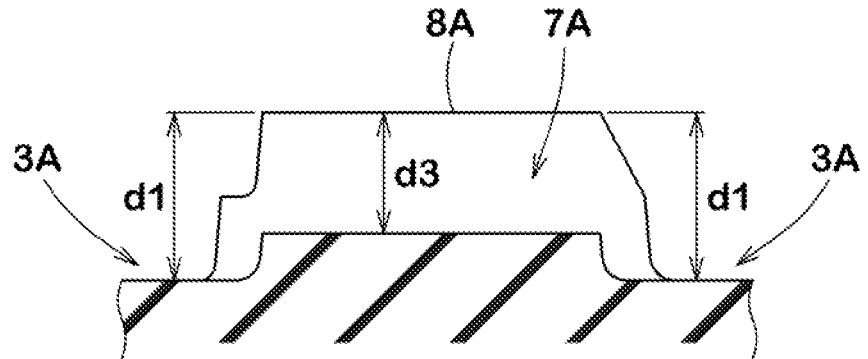
FIG. 9A is a cross-sectional view taken along M-M line of FIG. 8.

FIG. 8 is an enlarged view of the crown land region 4A. FIG. 9 is a cross-sectional view of one of the crown lateral grooves 7A taken along M-M line of FIG. 8. As shown in FIG. 9, a groove depth (d3) of each of the crown lateral grooves 7A in this embodiment is smaller than the groove depth (d1) of each of the crown main grooves 3A, for example. In other words, each of the crown lateral grooves 7A in this embodiment has a groove bottom raised from the groove bottoms of the crown main grooves 3A adjacent on both sides thereof in the tyre axial direction.

The crown land region positioned on the tyre equator receives large load from a road surface during running, therefore, it deforms and wears easily. The crown lateral grooves 7A in this embodiment are raised compared with the crown main grooves 3A, therefore, it is possible that they function like tie bars, for example. Thereby, the crown lateral grooves 7A in this embodiment supplement the rigidity of the crown blocks 8A, therefore, excessive deformation of the crown blocks 8A is suppressed, thus, it is possible that occurrence of the uneven wear is suppressed, for example.

Each of the crown blocks 8A in this embodiment has a plurality of crown sipes 23 each extending in the tyre axial direction, for example. The plurality of the crown sipes 23 in this embodiment includes a first crown sipe 23A, a second crown sipe 23B, and a third crown sipe 23C, for example.

The first crown sipe 23A in this embodiment is a semi-open sipe in which one end thereof is connected with one of the crown main grooves 3A and the other end thereof terminates within a respective one of the crown blocks 8A, for example. The first crown sipe 23A in this embodiment consists of a first crown sipe portion 24 and a second crown sipe portion 25, for example.

The first crown sipe portion 24 in this embodiment extends axially inwardly from one of the crown main grooves 3A and is inclined to the other side (the lower side in FIG. 8) in the tyre circumferential direction with respect to the tyre axial direction, for example. The second crown sipe portion 25 in this embodiment is inclined to one side (the upper side in FIG. 8) in the tyre circumferential direction with respect to the tyre axial direction and extends axially inwardly from an end portion of the first crown sipe portion 24 opposite to a connecting end portion thereof with the crown main groove 3A so as to cross the tyre equator (C) and terminate within the crown block 8A, for example.

The second crown sipe 23B in this embodiment is a full-open sipe in which both ends thereof are respectively connected with the crown main grooves 3A, for example. The second crown sipe 23B in this embodiment consists of a pair of first crown sipe portions 26 and a second crown sipe portion 27 connecting between the pair of the first crown sipe portions 26, for example.

Each of the first crown sipe portions 26 in this embodiment extends obliquely with respect to the tyre axial direction and axially inwardly from a respective one of the crown main grooves 3A, for example. The second crown sipe portion 27 in this embodiment extends obliquely with respect to the tyre axial direction so as to cross the tyre equator (C), for example. In this embodiment, it is preferred that an inclination angle of the second crown sipe portion 27 with respect to the tyre axial direction is larger than an inclination angle of each of the first crown sipe portions 26 with respect to the tyre axial direction, for example.

The third crown sipe 23C in this embodiment is a semi-open sipe in which one end thereof is connected with one of the crown main grooves 3A and the other end thereof terminates within the crown block 8A, for example. The third crown sipe 23C in this embodiment consists of a first crown sipe portion 28 and a second crown sipe portion 29, for example. The third crown sipe 23C in this embodiment has a shape that is point symmetric to the first crown sipe 23A with respect to one point on the tyre equator, for example.

Each of the crown blocks 8A in this embodiment has a shape and arrangement that is point symmetrical with respect to an intersection point (X) between the second crown sipe portion 27 and the tyre equator (C), for example.

The first crown sipe portions 24 and 28 in this embodiment are arranged in parallel to each other, for example. The second crown sipe portions 25 and 29 and the pair of the first crown sipe portions 26 are arranged in parallel to each other, for example.

The crown sipes 23 in this embodiment increase the edge components, therefore, it is possible that the traction is improved, for example. It is to be noted that the numbers and the arrangement of the crown sipes described above in each of the crown blocks 8A are merely examples and are not limited to the above-described embodiment.

As shown in FIG. 1, the tread portion 2 in this embodiment has a plurality of shoulder lateral grooves 7C each extending so as to cross a respective one of the shoulder land regions 4C in the tyre axial direction. Each of the shoulder land regions 4C is divided into a plurality of shoulder blocks 8C by the plurality of the shoulder lateral grooves 7C. The plurality of the shoulder blocks 8C in this embodiment includes a plurality of first shoulder blocks 8CA and a plurality of second shoulder blocks 8CB. Each of the first shoulder blocks 8CA has one of the first main groove side step-like portions (5A1) and each of the second shoulder blocks 8CB has one of the second main groove side step-like portions (5B1), for example. The plurality of the first shoulder blocks 8CA and the plurality of the second shoulder blocks 8CB in this embodiment are arranged alternately in the tyre circumferential direction.

Figure 9B:
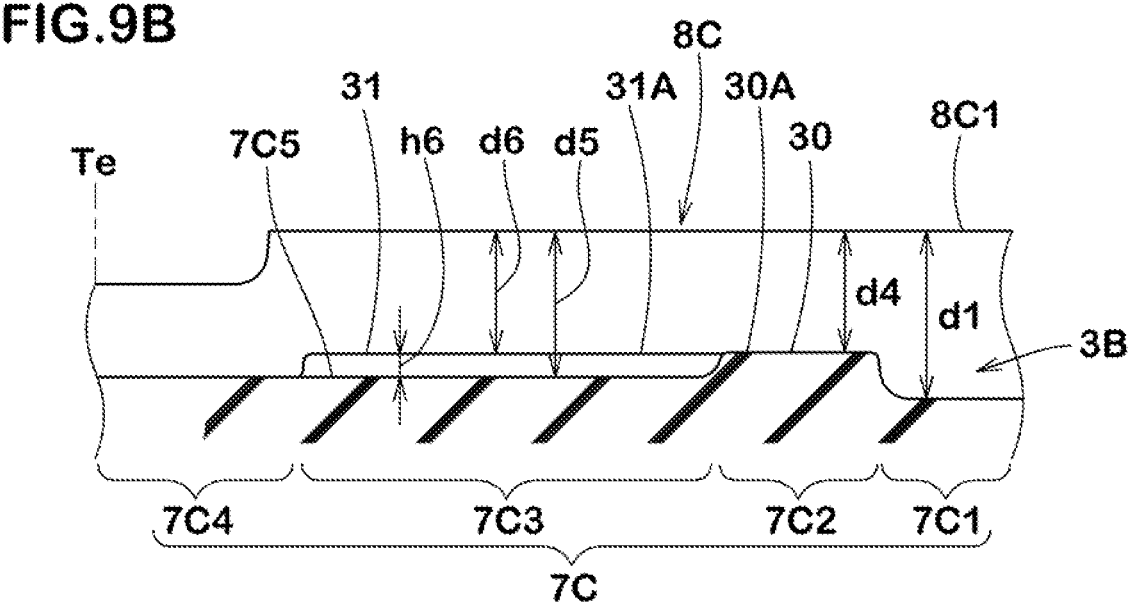
FIG. 9B is a cross-sectional view taken along N-N line of FIG. 10.
Figure 10:
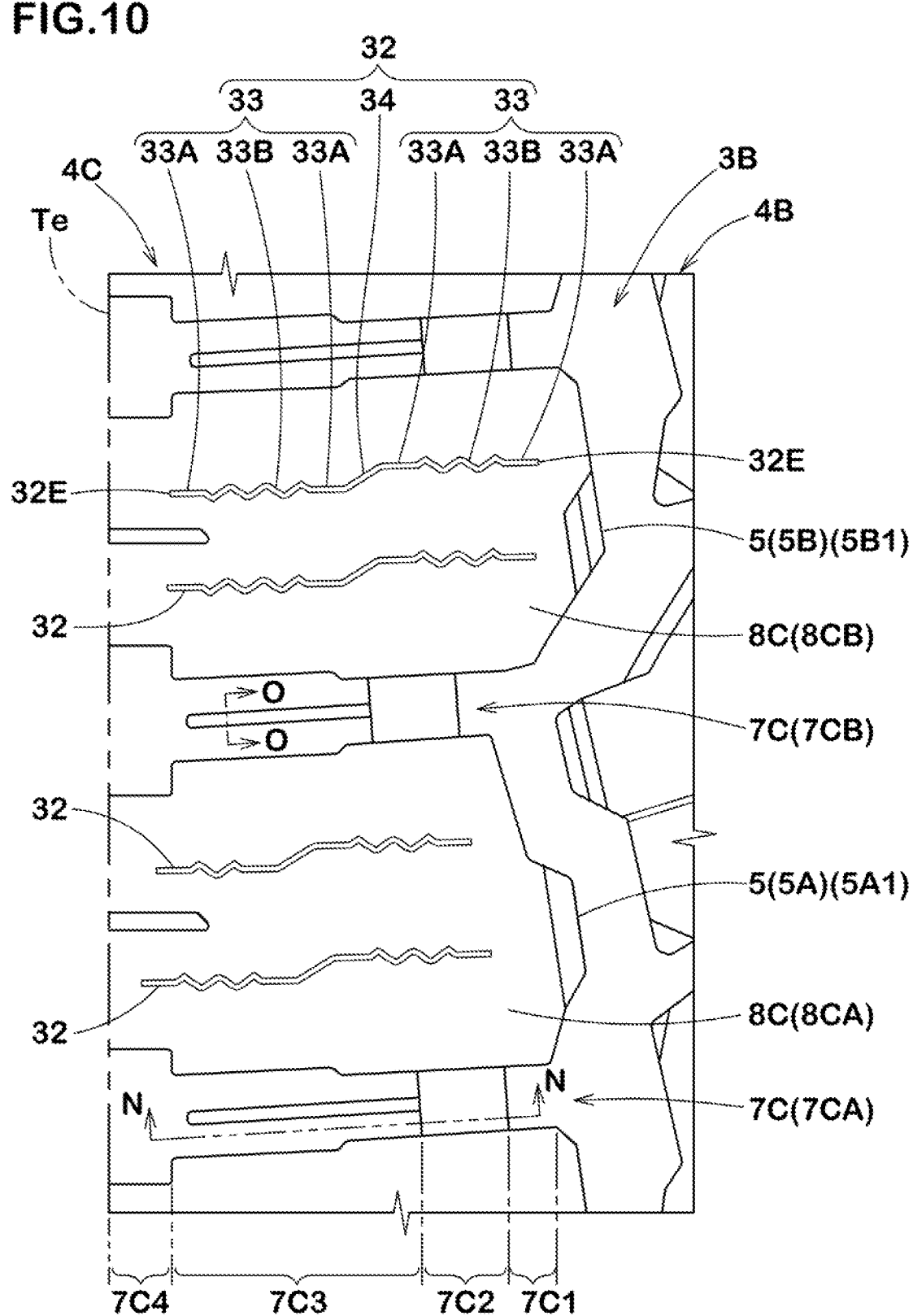
FIG. 10 is an enlarged view of one of shoulder land regions and one of the shoulder main grooves of FIG. 1.

FIG. 10 is an enlarged view of one of the shoulder land regions 4C. FIG. 9B is a cross-sectional view taken along N-N line of FIG. 10. As shown in FIG. 10, each of the shoulder lateral grooves 7C in this embodiment consists of a first shoulder lateral groove portion 7C1, a second shoulder lateral groove portion 7C2, a third shoulder lateral groove portion 7C3, and a fourth shoulder lateral groove portion 7C4, for example.

The first shoulder lateral groove portion 7C1 is a connection portion with one of the shoulder main grooves 3B. The second shoulder lateral groove portion 7C2 is formed so as to be connected with the first shoulder lateral groove portion 7C1 on the axially outer side thereof. The third shoulder lateral groove portion 7C3 is formed so as to be connected with the second shoulder lateral groove portion 7C2 on the axially outer side thereof. The fourth shoulder lateral groove portion 7C4 is formed so as to be connected with the third shoulder lateral groove portion 7C3 on the axially outer side thereof.

The second shoulder lateral groove portion 7C2 in this embodiment is provided with a bottom raised portion 30 formed over the entire second shoulder lateral groove portion 7C2, for example. Thereby, a groove depth (d4) of the second shoulder lateral groove portion 7C2 is smaller than the groove depth (d1) of the first shoulder lateral groove portion 7C1.

The third shoulder lateral groove portion 7C3 in this embodiment has a protruding portion 31 formed so that a part of a groove bottom thereof is raised, for example. The protruding portion 31 in this embodiment has an elongated shape along a longitudinal direction of the third shoulder lateral groove portion 7C3 and an end portion thereof on a side of an adjacent one of the shoulder main grooves 3B is connected with the bottom raised portion 30, for example.

In this embodiment, a distance, which is equal to the groove depth (d4), between a ground contacting surface (8C1) of a respective one of the shoulder blocks 8C and a top surface 30A of the bottom raised portion 30 is specifically 7.8 mm, for example. In this embodiment, a maximum groove depth (d5) at the third shoulder lateral groove portion 7C3 is specifically 9.4 mm, for example. In this embodiment, a height (h6) of the protruding portion 31 from a groove bottom (7C5) of the third shoulder lateral groove portion 7C3 is specifically 1.5 mm, for example. Thereby, in this embodiment, a distance (d6) between the ground contacting surface (8C1) and a top surface 31A of the protruding portion 31 is specifically 7.9 mm and substantially equal to the groove depth (d4), for example.

Figure 9C:
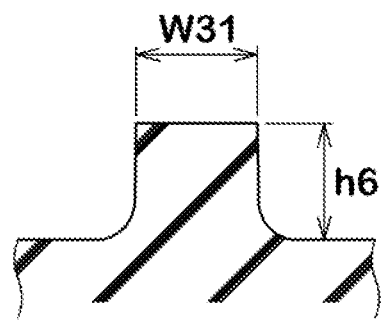
FIG. 9C is a cross-sectional view taken along O-O line of FIG. 10.

FIG. 9C is a cross-sectional view taken along O-O line of FIG. 10. As shown in FIG. 9C, the protruding portion 31 in this embodiment has the flat top surface and a width W31 thereof in a direction perpendicular to a longitudinal direction thereof is substantially equal to the height (h6), for example.

Each of the shoulder lateral grooves 7C configured as such in this embodiment has the bottom raised portion 30 and the protruding portion 31, therefore, decrease in rigidity of the shoulder blocks 8C is suppressed, thereby, it is possible that the uneven wear of the shoulder blocks 8C is suppressed.

It should be noted that, as shown in FIG. 10, the shoulder lateral grooves 7C in this embodiment include first shoulder lateral grooves 7CA and second shoulder lateral grooves 7CB, for example. A length of each of the first shoulder lateral grooves 7CA is different from a length of each of the second shoulder lateral grooves 7CB, for example. The first shoulder lateral grooves 7CA and the second shoulder lateral grooves 7CB in this embodiment are arranged alternately in the tyre circumferential direction, for example.

Each of the shoulder blocks 8C in this embodiment has a plurality of shoulder sipes 32, for example. Each of the shoulder sipes 32 in this embodiment is a closed-sipe whose both ends terminate within a respective one of the shoulder blocks 8C, for example. Each of the shoulder blocks 8C in this embodiment has a pair of the shoulder sipes 32 arranged in parallel to each other, for example.

Each of the shoulder sipes 32 in this embodiment includes a pair of end side sipe portions 33 extending from both ends 32E thereof in the tyre axial direction and a center sipe portion 34 extending linearly and obliquely with respect to the tyre axial direction so as to connect between the pair of the end side sipe portions 33, for example.

Each of the end side sipe portions 33 in this embodiment includes a pair of end side sipe parts 33A each extending linearly in the tyre axial direction and a center sipe part 33B extending in a zigzag shape so as to connect between the pair of the end side sipe parts 33A, for example.

It should be noted that, in this specification, the sipe part means a cut having a smaller width than that of a groove. Specifically, in this specification, the sipe part is defined as a cut having a width of 1.5 mm or less, for example. The center sipe part 33B is not limited to a zigzag shape, and may be configured in a wavy shape, for example.

By the shoulder sipes 32 configured as such in this embodiment, the edge components are increased, therefore, it is possible that the traction is improved, for example. It is to be noted that the shape, the number, and the arrangement of the shoulder sipes 32 described above in each of the shoulder blocks 8C are merely examples and are not limited to the above-described embodiment.

As shown in FIG. 2, the tread portion 2 in this embodiment has a plurality of first main groove side step-like portions 5A and a plurality of second main groove side step-like portions 5B arranged alternately in the tyre circumferential direction on the edge (4C1) of the shoulder land region 4C among the middle land region 4B and the shoulder land region 4C adjacent to each other on both sides of each of the shoulder main grooves 3B. However, the present invention is not limited to this, and a plurality of the first step-like portions and a plurality of the second step-like portions may be arranged alternately in the tyre circumferential direction on the edge (4B1) of the middle land region 4B.

Further, a plurality of the first step-like portions and a plurality of the second step-like portions may be arranged alternately in the tyre circumferential direction on at least one of the edges (4A1) of the crown land region 4A or at least one of the edges (4B3) of the middle land regions 4B.

As shown in FIG. 5, in the tread portion 2 in this embodiment, in the crown land region 4A and the middle land regions 4B adjacent to each other on both sides of each of the crown main grooves 3A, the edge (4A1) of the crown land region 4A is provided with only the first step-like portions and the edge (4B3) of the middle land region 4B is provided with only the second step-like portions. However, the present invention is not limited to this, and the edge (4A1) of the crown land region 4A may be provided with only the second step-like portions and the edge (4B3) of the middle land region 4B may be provided with only the first step-like portions.

Further, both the first step-like portions and the second step-like portions may be arranged on either one of the edge (4A1) of the crown land region 4A and the edge (4B3) of the middle land regions 4B. In this case, it is preferred that the either one of the edge (4A1) of the crown land region 4A and the edge (4B3) of the middle land regions 4B includes at least a part in which the first step-like portions and the second step-like portions are arranged alternately in the tyre circumferential direction.

Furthermore, both the first step-like portions and the second step-like portions may be arranged on both of the edge (4A1) of the crown land region 4A and the edge (4B3) of the middle land region 4B. In this case, it is preferred that the crown land region 4A and the middle land region 4B include at least a part in which the first step-like portions and the second step-like portions are arranged in the tyre circumferential direction in a staggered manner with the main groove in the middle.

Even furthermore, the edge (4A1) of the crown land region 4A may be provided with only either the first step-like portions or the second step-like portions and the edge (4B3) of the middle land region 4B may be provided with both of the first step-like portions and the second step-like portions. Conversely, the edge (4A1) of the crown land region 4A may be provided with both of the first step-like portions and the second step-like portions and the edge (4B3) of the middle land region 4B may be provided with only either the first step-like portions or the second step-like portions.

The above arrangements are not limited to a pair of the crown land region and the middle land region, and they may be applied to a pair of the middle land region and the shoulder land region. Specifically, the edge (4B1) of the middle land region 4B may be provided with only either the first step-like portions or the second step-like portions and the edge (4C1) of the shoulder land region 4C may be provided with both of the first step-like portions or the second step-like portions, for example. Conversely, the edge (4B1) of the middle land region 4B may be provided with both of the first step-like portions or the second step-like portions and the edge (4C1) of the shoulder land region 4C may be provided with only either the first step-like portions or the second step-like portions.

In the cases as described above, it is preferred that the tread portion 2 includes a part in which the first step-like portions and the second step-like portions are arranged alternately in the tyre circumferential direction on the edge on which both of the first step-like portions and the second step-like portions are arranged, for example. Alternatively, it is preferred that the tread portion 2 includes a part in which the first step-like portions and the second step-like portions are arranged in a staggered manner with one of the main grooves in the middle, for example.

While detailed description has been made of the tyre as especially preferred embodiments of the present invention, the present invention can be embodied in various forms without being limited to the illustrated embodiments.

Working Examples (Examples)

Tyres of size 265/70R17 having the basic pattern shown in FIG. 1 were made by way of test according to the specifications listed in Table 1, and then each of the test tyres was tested for traction performance on a soft road surface, and heel and toe uneven wear resistance performance. Common specifications of the test tyres and the test methods were as follows.

Tyre rim: 17×7.57
Tyre inner pressure: 240 kPa
Test vehicle: pickup vehicle

<Traction Performance on a Soft Road Surface>

Drive power and braking force were measured by a testing machine while the above test vehicle was driven on a soft road surface with a driver being the only member on the vehicle. The results are indicated by an evaluation point based on Conventional Example being 100, wherein a larger numerical value is better.

<Heel and Toe Uneven Wear Resistance Performance>

By using a wear energy analyzer on a GPS platform, wear energy during braking, driving, and cornering was measured. The results are indicated by an evaluation point based on the Conventional Example being 100, wherein a larger numerical value is better. The test results and the like are shown in Table 1.

TABLE 1

|  | Conventional Example | Ex. 1 | Ex. 2 | Ref. 1 | Ref. 2 | Ref. 3 | Ref. 4 |
|---|---|---|---|---|---|---|---|
| Protruding width of main groove side protruding portion/Main groove maximum width [%] | 20 | 50 | 75 | 85 | 20 | 50 | 50 |
| Height of one step of Main groove side step-like portion/ Groove depth of Main groove [%] | 50 (2 steps) | 50 (2 steps) 33 (3 steps) | 50 (2 steps) 33 (3 steps) | 50 (2 steps) | 50 (2 steps) 33 (3 steps) | 25 (4 steps) | 25 (4 steps) |
| Ratio of heights of one steps of Step-like portions adjacent to each other in same Main groove | 100% (1:1) | 150% (3:2) | 200% (2:1) | 100% (1:1) | 150% (3:2) | 100% (1:1) | 100% (1:1) |
| Traction performance on Soft road surface [evaluation point] | 100 | 115 | 120 | 110 | 100 | 105 | 100 |
| Heel and toe uneven wear resistance performance [evaluation point] | 100 | 100 | 100 | 90 | 100 | 95 | 100 |

The test results showed that the traction performance on a soft road surface was improved for the tyres as Examples as compared with the tyres as the Conventional Example and References. Further, the tyres as the Examples maintained the heel and toe uneven wear resistance performance equivalent to that of the Conventional Example, and showed equal or better heel and toe uneven wear resistance performance as compared with the tyres as the References. Thereby, it was confirmed that the tyres as the Examples had the uneven wear resistance performance and the running performance on a soft road surface in a good balance as compared with the tyres as the Conventional Example and the References.

The invention claimed is:

1. A tyre comprising a tread portion having a main groove extending continuously in a tyre circumferential direction and a pair of land regions adjacent to the main groove on both sides thereof, wherein
at least one of the pair of the land regions has, on an edge thereof facing the main groove, a plurality of main groove side step-like portions,
a height of each of the plurality of the main groove side step-like portions is decreased stepwise in two or more steps from a ground contacting surface of the at least one of the pair of land regions to a bottom surface of the main groove,
the plurality of the main groove side step-like portions includes only a plurality of first main groove side step-like portions and a plurality of second main groove side step-like portions having different numbers of the steps from each other,
each of the second main groove side step-like portions has a larger number of the steps than each of the first main groove side step-like portions, and
in a plan view of the tread portion viewed along a tyre radial direction, each of the second main groove side step-like portions is arranged spaced apart from all other main groove side step-like portions.

2. The tyre according to claim 1, wherein a height of one step of the steps of the first main groove side step-like portions is different from that of the second main groove side step-like portions.

3. The tyre according to claim 1, wherein
the tread portion includes at least a part in which the first main groove side step-like portions and the second main groove side step-like portions are arranged alternately in the tyre circumferential direction, and
the first main groove side step-like portions and the second main groove side step-like portions are arranged on one of the pair of land regions.

4. The tyre according to claim 1, wherein
the tread portion includes at least a part in which the first main groove side step-like portions and the second main groove side step-like portions are arranged alternately in the tyre circumferential direction, and
the first main groove side step-like portions and the second main groove side step-like portions of the at least one of the pair of the land regions are arranged on both of the pair of the land regions in a staggered manner with the main groove in the middle.

5. The tyre according to claim 1, wherein a protruding width of each of the main groove side step-like portions in a protruding direction from the ground contacting surface of the at least one of the pair of the land regions to the bottom surface of the main groove is in a range of from 25% to 75% of a maximum width of the main groove.

6. The tyre according to claim 1, wherein
the at least one of the pair of the land regions has at least one main groove side protruding portion in which a part of the at least one of the pair of the land regions protrudes toward the main groove, and
at least one of the plurality of the main groove side step-like portions is arranged at an end portion on a side of the main groove of the main groove side protruding portion.

7. The tyre according to claim 1, wherein in at least one of the plurality of the main groove side step-like portions, a first step from the ground contacting surface is smoothly and gradually decreased in height in a slope shape.

8. A tyre comprising a tread portion having a main groove extending continuously in a tyre circumferential direction and a pair of land regions adjacent to the main groove on both sides thereof, wherein
at least one of the pair of the land regions has, on an edge thereof facing the main groove, a plurality of main groove side step-like portions,
a height of each of the plurality of the main groove side step-like portions is decreased stepwise in two or more steps from a ground contacting surface of the at least one of the pair of the land regions to a bottom surface of the main groove,
the plurality of the main groove side step-like portions includes a plurality of first main groove side step-like portions and a plurality of second main groove side step-like portions having different numbers of the steps from each other,
each of the second main groove side step-like portions has a larger number of the steps than each of the first main groove side step-like portions,
the main groove extends in a zigzag manner,
the tread portion has a plurality of lateral grooves extending from the main groove in a tyre axial direction and arranged at intervals in the tyre circumferential direction, and
at least one of the lateral grooves is connected to a peak of the zigzag of the main groove to form a Y-shaped three-way junction, and among three corner portions of the land regions forming the three-way junction, one corner portion not immediately adjacent to the at least one of the lateral grooves is provided with one of the second main groove side step-like portions, and each of the other two corner portions is provided with one of the first main groove side step-like portions.

9. The tyre according to claim 8, wherein a height of one step of the steps of the first main groove side step-like portion is different from that of the second main groove side step-like portion.

10. The tyre according to claim 8, wherein
the tread portion includes at least a part in which the first main groove side step-like portions and the second main groove side step-like portions are arranged alternately in the tyre circumferential direction, and
the first main groove side step-like portions and the second main groove side step-like portions are arranged on one of the pair of the land regions.

11. The tyre according to claim 8, wherein
the tread portion includes at least a part in which the first main groove side step-like portions and the second main groove side step-like portions are arranged alternately in the tyre circumferential direction, and
the first main groove side step-like portions and the second main groove side step-like portions of the at least one of the pair of the land regions are arranged on both of the pair of the land regions in a staggered manner with the main groove in the middle.

12. The tyre according to claim 8, wherein a protruding width of each of the main groove side step-like portions in a protruding direction from the ground contacting surface of the at least one of the pair of the land regions to the bottom surface of the main groove is in a range of from 25% to 75% of a maximum width of the main groove.

13. The tyre according to claim 8, wherein
the at least one of the pair of the land regions has at least one main groove side protruding portion in which a part of the at least one of the pair of the land regions protrudes toward the main groove, and
at least one of the plurality of the main groove side step-like portions is arranged at an end portion on a side of the main groove of the main groove side protruding portion.

14. The tyre according to claim 8, wherein in at least one of the plurality of the main groove side step-like portions, a first step from the ground contacting surface is smoothly and gradually decreased in height in a slope shape.

15. A tyre comprising a tread portion having a main groove extending continuously in a tyre circumferential direction and a pair of land regions adjacent to the main groove on both sides thereof, wherein
at least one of the pair of the land regions has, on an edge thereof facing the main groove, a plurality of main groove side step-like portions,
a height of each of the plurality of the main groove side step-like portions is decreased stepwise in two or more steps from a ground contacting surface of the at least one of the pair of the land regions to a bottom surface of the main groove,
the plurality of the main groove side step-like portions includes a plurality of first main groove side step-like portions and a plurality of second main groove side step-like portions having different numbers of the steps from each other,
each of the second main groove side step-like portions has a larger number of the steps than each of the first main groove side step-like portions,
both of the land regions have the second main groove side step-like portions, and
the second main groove side step-like portions of one of the land regions overlap in a tyre axial direction with the second main groove side step-like portions of the other land region.

16. The tyre according to claim 15, wherein a height of one step of the steps of the first main groove side step-like portion is different from that of the second main groove side step-like portion.

17. The tyre according to claim 15, wherein
the tread portion includes at least a part in which the first main groove side step-like portions and the second main groove side step-like portions are arranged alternately in the tyre circumferential direction, and
the first main groove side step-like portions and the second main groove side step-like portions are arranged on one of the pair of the land regions.

18. The tyre according to claim 15, wherein
the tread portion includes at least a part in which the first main groove side step-like portions and the second main groove side step-like portions are arranged alternately in the tyre circumferential direction, and
the first main groove side step-like portions and the second main groove side step-like portions of the at least one of the pair of the land regions are arranged on both of the pair of the land regions in a staggered manner with the main groove in the middle.

19. The tyre according to claim 15, wherein a protruding width of each of the main groove side step-like portions in a protruding direction from the ground contacting surface of the at least one of the pair of the land regions to the bottom surface of the main groove is in a range of from 25% to 75% of a maximum width of the main groove.

20. The tyre according to claim 15, wherein
the at least one of the pair of the land regions has at least one main groove side protruding portion in which a part of the at least one of the pair of the land regions protrudes toward the main groove, and
at least one of the plurality of the main groove side step-like portions is arranged at an end portion on a side of the main groove of the main groove side protruding portion.

* * * * *